(12) United States Patent
Lee et al.

(10) Patent No.: US 8,200,743 B2
(45) Date of Patent: Jun. 12, 2012

(54) ANOMALY MANAGEMENT SCHEME FOR A MULTI-AGENT SYSTEM

(75) Inventors: Habin Lee, Ipswich (GB); Patrik Mihailescu, Ipswich (GB); John W Shepherdson, Sudbury (GB)

(73) Assignee: British Telecommunications public limited company, London (GB)

( * ) Notice: Subject to any disclaimer, the term of this patent is extended or adjusted under 35 U.S.C. 154(b) by 1303 days.

(21) Appl. No.: 10/592,669

(22) PCT Filed: Mar. 11, 2005

(86) PCT No.: PCT/GB2005/000960
§ 371 (c)(1), (2), (4) Date: Sep. 13, 2006

(87) PCT Pub. No.: WO2005/093574
PCT Pub. Date: Oct. 6, 2005

(65) Prior Publication Data
US 2007/0192400 A1    Aug. 16, 2007

(30) Foreign Application Priority Data

Mar. 22, 2004 (GB) .................................. 0406401.0

(51) Int. Cl.
*G06F 15/173* (2006.01)
*G06F 3/00* (2006.01)
*G06F 15/16* (2006.01)

(52) U.S. Cl. .................... 709/202; 709/224; 719/313

(58) Field of Classification Search .................. 370/216; 709/201, 202, 224, 227; 714/2, 4, 25; 719/313, 719/317, 318
See application file for complete search history.

(56) References Cited

U.S. PATENT DOCUMENTS 6,212,649 B1 * 4/2001 Yalowitz et al. ................ 714/31

(Continued)

FOREIGN PATENT DOCUMENTS

EP    0930756 A2    7/1999

(Continued)

OTHER PUBLICATIONS

Title: "Fault-Management in MAS" Date: 2003 Author: Peng Xu.*

(Continued)

*Primary Examiner* — Jeffrey R Swearingen
*Assistant Examiner* — Taylor Elfervig
(74) *Attorney, Agent, or Firm* — Nixon & Vanderhye P.C.

(57) ABSTRACT

An anomaly management method is provided for a multi-agent system (MAS) in which a plurality of application agents are arranged to be capable of interacting with each other over a communications network. The MAS has a plurality of anomaly management agents arranged to receive reports from a referring agent regarding a referred agent when a referring agent has determined an interaction anomaly has occurred which was potentially caused by one or more conditions associated with a referred agent. The anomaly management agent is arranged to determine one or more conditions associated with the referred agent which have caused the interaction anomaly. The anomaly management agent is also arranged to remedy the condition. The method comprises at least one of said plurality of anomaly management agents receiving a message containing information related to the interaction with the referred agent from the referring agent. The message comprises information identifying the referred agent and other information related to the interaction anomaly. One or more possible conditions associated with the referred agent which may have caused the interaction anomaly are determined from the information provided by the referring agent. A plurality of tests is then performed to determine at least one condition associated with the referred agent. Finally, the condition associated with the referred agent is remedied. The referring agent may then be provided with feedback information to enable the interaction to be resumed.

47 Claims, 11 Drawing Sheets

U.S. PATENT DOCUMENTS

| | | | |
|---|---|---|---|
| 6,349,325 B1 * | 2/2002 | Newcombe et al. | 709/202 |
| 6,460,070 B1 | 10/2002 | Turek et al. | |
| 6,466,974 B1 | 10/2002 | Nelson et al. | |
| 6,665,262 B1 * | 12/2003 | Lindskog et al. | 370/216 |
| 6,718,482 B2 * | 4/2004 | Sato et al. | 714/4.4 |
| 2002/0042823 A1 * | 4/2002 | DeBettencourt et al. | 709/224 |
| 2003/0036886 A1 | 2/2003 | Stone | |
| 2004/0199643 A1 * | 10/2004 | Thompson et al. | 709/227 |
| 2005/0138167 A1 * | 6/2005 | Whitman, Jr. | 709/224 |

FOREIGN PATENT DOCUMENTS

| | | |
|---|---|---|
| GB | 2346461 A | 8/2000 |
| WO | WO 00/58881 | 10/2000 |
| WO | WO 2004/086163 A2 | 10/2004 |

OTHER PUBLICATIONS

Titlw: "FIPA Agent Management Specification" Date: 2002 Publisher: FIPA.*

Lane et al., "Temporal sequence learning and data reduction for anomaly detection", Aug. 1999, ACM Publication—Transactions on Information and System Security (TISSEC), vol. 2 Issue 3, pp. 295-331.*

Lane et al., "An Empirical Study of Two Approaches to Sequence Learning for Anomaly Detection", Apr. 2003, Kluwer Academic Publishers—Machine Learning, vol. 51 Issue 1, pp. 73-107.*

Ramasubramanian, P.; Kannan, A.; , "Intelligent multi-agent based back-propagation neural network forecasting model for statistical database anomaly prevention system," Intelligent Sensing and Information Processing, 2004. Proceedings of International Conference on , vol., No., pp. 108-113, 2004.*

International Search Report dated Dec. 2, 2005.

Hagg, "A Sentinel Approach to Fault Handling in Multi-Agent Systems", "Multi-Agent Systems, Methodologies and Applications, Second Australian Workshop on Distributed Artificial Intelligence. Selected Pates", 27$^{th}$ Aug. 1996, Published 1997, pp. 181-195.

Klein et al., "Using Domain-Independent Exception Handling Services to Enable Robust Open Multi-Agent Systems: The Case of Agent Death", Journal of Autonomous Agents and Multi-Agent Systems, 2001.

Ogunleye, "The State Detection of a Multi-agent System", Working Paper, Department of Computer Science, university of Saskatchewan, Canada, circa 2000.

Xu et al., "Fault Management in MAS", Proceedings of the 2002-2003 Grad Symposium, CS Dept. University of Saskatchewan, 10$^{th}$ Apr. 2003, Acknowledged by the Inventors and cited as "X" and "Y" category prior art in the International Search Report.

Xu, "Fault-Management in Multi-Agent Systems", circa 2003.

Kumar et al., "Towards a Fault-Tolerant Multi-Agent System Architecture", Proceedings of the Fourth International Conference on Autonomous Agents (Agents 2000), ACM Press, Barcelona, Spain, Jun. 3-7, 2000, pp. 459-466.

Kumar et al., "The Adaptive Agent Architecture: Achieving Fault-Tolerance Using Persistent Broker Teams", Proceedings of the Fourth International Conference on Multi-Agent Systems (ICMAS 2000), MA, USA Jul. 7-12, pp. 156-166.

Chen et al., "Multi-Agent Co-operative Transactions for E-Commerce", Proc. Fifth IFCIS Conference on Co-operative Information Systems (CooopIS'2000, Israel).

Varakantham et al., "On Handling Component and Transaction Failures in Multi-Agent Systems", ACM SIGecom Exchanges, vol. 3.1, pp. 32-43, 2002.

Lee et al., "A Multi-Agent System to Support Team-based Job Management in a Telecommunications Service Environment", TI Lab Journal Exp, 3 (3), 96-105, 2003.

"FIPA Agent Management Specification", Foundation for Intelligent and Physical Agents (FIPA), Online, Mar. 12, 2002, XP002296471, Geneva, Switzerland, Retrieved from the Internet: URL: http;//www.fipa.org/specs/fipa00023/sc00023j.html, whole document.

Shepherdson et al., mPower—A Component-based Development Framework for Multi-Agent Systems to Support Business Process, BT Technology Journal, 21(4), 92-103, 2003.

Jade Platform, see http://jade.cselt.it 2006.

Brewington et al., "Mobile Agents in Distributed Information Retrieval" in Intelligent Information Agents, Cahpter 12, Springer-Verlag, 1999, p. 29, http://citeseer.nj.nec.com/brewington99mobile.html.

Cost et al., "Jackal: A Java Based Tool for Agent Development", http://www.csee.umbc.edu/~cost/projects/jackal/assi98.pdf.

Klein et al., "Exception Handing in Agent Systems", Proceedings of the Third International Conference on Autonomous Agents, 1999, pp. 62-68, XP002335956, ACM Press, New York, NY.

Xu et al., "MAS & Fault-Management", Applications & the Internet, 2004, Proceedings, 2004 Internatinal Symposium on Tokyo, Japan, Jan. 26-30, 2004, Los Alamitos, CA, USA, IEEE Comput. Soc., US, Jan. 26, 2004, pp. 283-286, XP 010682163.

Cetnarowicz et al., "Functional Integrity of MAS Through the Dynamics of the Agents' Population", Multi-Agent Systems, 1998, Proceedings, International Conference, Paris, France Jul. 3-7, 1998, Los Alamitos, CA, USA, IEEE Comput., Soc., US, Jul. 3, 1998, pp. 405-406, XP0102927.

Ka-Po Chow et al., "On Load-Balancing for Distributed Multi-Agent Computing", IEEE Transactions on Parallel and Distributed Systems IEEE USA, vol. 13, No. 8, Aug. 2002, pp. 787-801, XP 002357151, ISSN 1045-9219, pp. 790.

EPO Office Action dated Jan. 2007.

* cited by examiner

ANOMALY MANAGEMENT SCHEME FOR A MULTI-AGENT SYSTEM

This application is the U.S. national phase of international application PCT/GB 2005/000960 filed 11 Mar. 2005 which designated the U.S. and claims benefit of GB 0406401.0, dated 22 Mar. 2004, the entire content of which is hereby incorporated by reference.

The present invention relates to a management scheme for a multi-agent system (MAS). In particular, but not exclusively to a fault management scheme which is scalable as the number of agents within the MAS rises.

In any distributed computer environment within which inter-agent interactions are supported by a MAS, a variety of differing types of anomalies may occur when one agent interacts or seeks to interact with another agent. For example, when a MAS is provided in a wireless network environment, mobile devices may disconnect suddenly from the network for a variety of reasons, causing sudden disruptions to service. Such disconnections are particularly frustrating where the disrupted service involves time-critical applications.

One cause of anomalous interactions between agents are conditions such as faults occurring at the device level, agent container level or agent level, or conditions associated with a particular service of one or more agents. Anomalous interactions between agents can also arise where the application with which one agent is associated is a different version of the application from the version of the application the other agent is expecting and/or has the capability to manage interactions with.

A device may develop a condition such as a device level fault which affects the capability of an agent located on the device to interact with other agents. A device level fault can interrupt a service and cause a sudden disconnection from the network. For example, the device may be physically disconnected from the network, due to a drop in signal power or quality, or by a connection becoming loose, or the device may simply no longer have sufficient power to function (e.g. a drained battery).

An agent container may develop a condition such as an agent container fault which prevents all of the agents associated with the agent container (which is supported by an appropriate platform provided on a device) from functioning properly.

An individual agent may develop a condition which causes the individual agent associated with an agent container and located on a device to cause an interaction anomaly when it participates or seeks to participate in an interaction with another agent. In such a case it is desirable to repair or replace the agent causing the anomaly with a replica as rapidly and seamlessly as possible to minimise disruption for a user.

One type of known MAS fault management scheme provides each application agent with a fault management agent known in the art as a "Sentinel" agent which monitors the interactions of that agent with other agents, and which intervenes to manage any faults which arise during such interactions. However, the one to one mapping of application agents to fault management agents in such schemes is very disadvantageous in large MAS systems, as the communications overhead between the Sentinel agent and its ward can be onerous. Therefore such a fault management system is not suitable where the MAS comprises a very large number of agents, for example, several thousand or more agents.

One objective of the present invention is to provide a management scheme for a MAS which seeks to obviate and/or mitigate the drawbacks of known MAS fault management schemes by providing an improved interaction anomaly management scheme for a MAS.

A first aspect of the invention relates to an agent management system for a multi-agent system, in which a first agent which does not perform in accordance with the expectations of another agent is reported by the other agent to an anomaly management agent, the system comprising: means to generate a report identifying the first agent at least one anomaly management agent in say multi-agent system; and means to process the information provided by the message to determine at least one causal condition why the first agent demonstrated the performance triggering the report generation.

The first agent may not perform in accordance with the expectations of said other agent as the first agent has a fault.

The anomaly management agent may be arranged to diagnosis the type of fault causing the agent to perform in a manner which triggered said other agent tot generate said report.

A second aspect of the invention relates to an multi-agent system comprising a plurality of agents, in which at least one agent is arranged to generate a report referring one or more other agents of the system to at least one anomaly management agent should the one or more other agents fail to interact with said at least one agent in accordance with one or more predetermined interaction expectations of said at least one agent, the system comprising: message generation means arranged to enable said at least one agent to generate a message containing information related to the interaction anomaly, whereby each message enables the one or more other agents to be identified by at least one anomaly management agent; and message sending means arranged to enable said at least one agent to refer the one or more other agents to at least one anomaly management agent by sending the report message; processing means arranged to process the information provided by the message to determine at least one causal condition for the failure of said one or more other agents to interact with said at least one agent in accordance with one or more predetermined expectations of said at least one agent.

A third aspect of the invention relates to a fault management system for a multi-agent system, in which a first agent which does not perform in accordance with the expectations of another agent is reported by the other agent to an anomaly management agent, the system comprising:

means to generate a report identifying the first agent at least one anomaly management agent in say multi-agent system; and means to process the information provided by the message to determine at least one causal condition why the first agent demonstrated the performance triggering the report generation.

A fourth aspect of the invention relates to an agent referral method for a multi-agent system in which a first agent is participating or seeking to participate in an interaction with another agent to refer the other agent to at least one anomaly management agent in the multi-agent system to determine if a condition related to the other agent has caused an interaction anomaly in an interaction between the first agent and the other agent detected by the first agent, the referral process comprising the first agent performing the steps of: determining that an interaction anomaly has occurred if the interaction with said other agent does not proceeding in accordance with the expectations of the first agent; the first agent generating a report message which contains information related to the interaction anomaly and enabling the other agent to be identified by an anomaly management agent; and the first agent referring the other agent by sending the report message to at least one anomaly management agent, whereby the information provided by the report is processed by a receiving anomaly management agent to determine at least one condition affecting the other agent causing an interaction anomaly comprising the other agent not interacting with the first agent according to the expectations of the first agent.

The first agent may seek to initiate participation in the interaction with the other agent, prior to said step of determining that the interaction with said other agent is not proceeding in accordance with the expectations of the first agent.

The first agent may seek to respond to the other agent to participate in an interaction with the other agent, prior to said step of determining that the interaction with said other agent is not proceeding in accordance with the expectations of the first agent.

At least one condition causing the interaction anomaly may comprise a fault related to a service component of the other agent. Alternatively, at least one condition causing an interaction anomaly may comprise a fault related to the device supporting the other agent. Alternatively, at least one condition causing the interaction anomaly may comprise a fault related to the agent container associated with the other agent. Alternatively, at least one condition causing the interaction anomaly comprises a fault related to the other agent.

The first agent may report to one of a plurality of anomaly management agents arranged to manage referrals related to the other agent, said one of the plurality of anomaly management agents having been associated with the referred agent in accordance with a load balancing rule implemented within the multi-agent system using one or more agent description directories provided for the MAS.

The first agent may determine which anomaly management agent within the MAS arranged should receive the report message by first communicating with one or more agent description directories which associate the referred agent with one or more anomaly management agents.

The anomaly management agent processing the reported information may proceed to implement an anomaly management scheme, the anomaly management scheme remedying the at least one condition affecting the other agent.

A fifth aspect of the invention relates to an agent in a multi-agent system, the agent comprising:
  means to seek to participate in an interaction with at least said other agent in the multi-agent system;
  means to determine that an interaction anomaly has occurred;
  means to generate a report message for the other agent; and
  means to refer the other agent to at least one anomaly management agent, to enable the other anomaly agent to implement an anomaly management scheme to remedy the at least one condition affecting the other agent.

A sixth aspect relates to an anomaly management agent in a multi-agent system, the anomaly management agent comprising:
  means to receive a report message, the report message containing information determined by a first agent concerning the experience of the first agent with another agent, which enables the other agent to be identified to the anomaly management agent; means to process the information received to determine one or more characteristics of other agent; means to determine said at least one condition associated with the other agent and causing the interaction anomaly; and means to remedy said at least one condition.

Another aspect of the invention relates to a method of determining the cause of an interaction anomaly detected in the interaction between a referring agent and a referred agent, the referring agent referring the referred agent to at least one anomaly management agent in a multi-agent system using the method as claimed in any one of claims 1 to 10, wherein an anomaly management agent determines at least one condition associated with the referred agent which has caused the interaction by processing information provided by the referring agent, the method comprising the steps of: processing information provided by the referring agent to identify the device associated with the referred agent; sending a test message to a device associated with the referred agent to determine if at least one condition is associated with the device is a condition which caused the interaction anomaly in the interaction between the referring and referred agents; and in the event no response to the test message is received by the anomaly management agent from the device, or if a test message is received containing information which, when processed indicates that the device has a condition which caused the interaction anomaly; determining a condition affecting the device exists which has caused the anomaly in the interaction between the referred and referring agents.

The condition determined may be a fault associated with the device.

In the step of processing information provided by the referring agent to identify the device associated with the referred agent, the agent container associated with the referred device may also be identified. The method may further comprise the steps of:
  sending a test message to the agent container of the referred agent; and, in the event no response to the test message is received from the agent container or if a test message is received containing information which, when processed indicates that the agent container has a condition which caused the interaction anomaly; and determining a condition affecting the agent container exists which has caused the interaction anomaly in the interaction between the referred and referring agents.

The condition of the agent container may be a fault associated with the agent container.

The method may further comprise: sending a test message to the referred agent to determine if the referred agent has a condition which caused the interaction anomaly; and if the response from the referred agent does not meet one or more predetermined criteria, determining the agent has a condition which has caused the interaction anomaly.

The anomaly management agent may determine that the detected condition is related to a fault associated with the referred agent. The condition may not be related to a fault associated with the referred agent, and the anomaly management agent determines that the detected condition requires the referred agent to be modified to interact with the referring agent. In the event that no condition is determined by the anomaly management agent to be associated with the referred agent, the anomaly management agent may perform a service level test. Following the determination of one or more conditions which have caused the interaction anomaly, the anomaly management agent may further perform the steps of: generating appropriate feedback information related to the condition; and sending the feedback information to the referring agent.

Another aspect of the invention relates to an anomaly management method in a multi-agent system in which a plurality of application agents are arranged to be capable of interacting with each other over a communications network, the multi-agent system having a plurality of anomaly management agents arranged to receive reports from a referring agent regarding a referred agent when the referring agent has determined an interaction anomaly has occurred which was potentially caused by one or more conditions associated with a referred agent, wherein the anomaly management agent is arranged to determine one or more conditions associated with the referred agent which have caused the interaction anomaly and wherein the anomaly management agent is further arranged to remedy the condition to remove it, the method comprising: at least one of said plurality of anomaly management agents receiving a message containing information related to the interaction with the referred agent from the referring agent, the message comprising information identifying the referred agent and other information related to the interaction anomaly; identifying one or more possible conditions associated with the referred agent from the information provided by the referring agent which may have caused the interaction anomaly; performing a plurality of tests to determine at least one condition associated with the referred agent and selected from said possible one or more conditions of the referred agent which caused the anomaly to occur; and remedying the condition associated with the referred agent.

At least one condition associated with the referred agent may be a condition associated with one of the following: the device associated with the referred agent; the agent container associated with the referred agent; the referred agent; the service provided by the referred agent. At least one condition may comprise a fault.

The referring agent may select an anomaly management agent to refer the referred agent to by reference to a location directory and a service directory containing a description of one or more characteristics of the referred agent which associates the referred agent with a anomaly management agent. The referring agent may provide information to the anomaly management agent which includes the following information: identifying the referred agent; the time of the referral; one or more detected conditions associated with the referred agent which the referring agent has determined are relevant to the anomaly; and the identity of the reporting agent.

The referred agent may comprise one or more role components, and wherein the anomaly management agent is capable of communicating with a mediating agent to provide a description of each of said one or more role components, wherein, the condition which causes the anomaly in the interaction between the referred agent and the referring agent is determined to be associated with the service provided by the referred agent, and to remedy the condition, the anomaly management agent obtains a new description of a service role component for the referred agent from the mediating agent. If a condition is determined to exist with a referred agent which has cause the anomaly, the anomaly management agent may move to the agent container of the referred agent with the condition and the following steps may be performed: creating a replica agent of the referred agent; copying the internal state of the referred agent to the replica agent; updating said registry means by replacing the referred agent registry entry with a registry entry for the replica agent, to enable the replica agent to interact with the referring agent.

The referred agent may be provided with at least one service role component and wherein said at least one service role component is determined to be a cause of a condition causing the interaction anomaly, and the method may further comprise: the anomaly management agent sending a request message to the referred agent identifying said at least one service role component causing the interaction anomaly; the referred agent processing the received message; the referred agent sending a message to a mediator agent in the multi-agent system; the mediator agent providing a replacement service role component for each service role component causing the interaction anomaly to the referred agent; and the referred agent replacing each service role component causing the interaction anomaly with a service role component provided by the mediator agent.

When said at least one condition associated with the referred agent is a condition associated with the agent container provided by the referred agent, the method may further comprises the steps of: the anomaly management agent sending a notification message to a demon agent of a device associated with the referred agent; on receiving the message, the demon agent creating a replica container of the agent container of the referred agent; the demon agent creating one or more replica agents for each of the agents in the agent container; the demon agent copying the internal states of the one of more agents in the agent container into one or more replica agents in the replica container; and the demon agent updating a location directory and a service directory with agent descriptions of each of the replica agents. The multi-agent system may be implemented in accordance with the FIPA standards, and said location directory comprises a white page facility and said service directory comprises a yellow page facility.

The method may further comprise: in a feedback stage, the anomaly management agent sending a feedback report to the referring agent indicating the status of the referred agent following implementation of an anomaly management process.

Another aspect of the invention relates to a multi-agent system comprising a plurality of anomaly management agents, wherein each anomaly management agent is associated with one or more agent containers, each agent container being associated with at least one agent, the system further comprising: an agent location registry and an agent service registry, the agent location registry and agent service registry collectively providing a description of the location and service of agents in the multi-agent system, wherein each of said anomaly management agents is associated with one or more agents of the multi-agent system, wherein collectively the agent location registry and the agent service registry are arranged to enable a referring agent to identify an anomaly management agent for reporting to when another agent is suspected of having a condition which causes an interaction anomaly in an interaction between the referred agent and the referring agent.

The agent location registry and agent service registry may each be supported by a different container in the multi-agent system to the container supporting the referring agent.

An anomaly management agent may be relocated to the device associated with the referred agent when an anomaly report is received by the anomaly management agent.

Each agent of the multi-agent system may comprise an application agent is arranged to interact with other application agents via one or more executable software components.

A demon agent may reside on each client device associated with an application agent of the multi-agent system, wherein each demon agent is arranged to monitor the functionality of the application agent of its client device.

One or more executable software component mediator agents may maintain a library of executable software components for an application agent of the multi-agent system to enable the application agent to respond to query messages from application agents.

An anomaly management agent may contact an agent management system agent and a directory facility agent in the multi-agent system to update one or more registries of the multi-agent system with information related to the referred agent following the anomaly management agent remedying a condition associated with the referred agent which caused the interaction anomaly.

The information provided to update at least one of said one or more registries of the multi-agent system may comprise information related to a replica agent replacing the referred agent.

An application agent, an agent container, and a demon agent residing on a client device in the multi-agent system may each implement a test interface that responds to a test message from an anomaly management agent of the multi-agent system.

Another aspect of the invention relates to an application provided on a device in the client domain of the multi-agent system according to any appropriate system aspect of the invention, the application providing one or more application agents adapted to refer other agents in the system to an anomaly management agent.

Another aspect relates to the apparatus arranged to provide a platform supporting the application aspect of the invention.

Another aspect relates to a load balancing scheme arranged to be implemented in any appropriate ones of the multi-agent system aspects of the invention, wherein the scheme maintains the number of anomaly management agents associated with a number of agents within a predetermined range, the method comprising the steps of: determining the number of application agents in each agent group of the multi-agent system; determining the number of anomaly management agents responsible for each agent group of the multi-agent system; determining, for each agent group of the multi-agent system, the ratio of the number of anomaly management agents providing an anomaly management service for each application agent in the agent group to the number of application agents in the agent group, and, modifying the location directory and/or service directory entry for one or more anomaly management agents associated with said agent groups for which the ratio is above the predetermined range to re-associate the anomaly management agents with agent groups for which the ratio is below said predetermined range.

Any deviation from the expected (and/or required) communication between two or more agents seeking to interact with each other or participating in an interaction with each other is considered an anomaly. A cause of an anomaly includes any condition which could cause an interaction or attempted interaction between the agents to exhibit an anomaly from the perspective of one of the agents participating or seeking to participate in the interaction. Examples of conditions likely to cause an anomaly include faults associated with the device and/or agent container and/or agent and/or service of one or more of the agents seeking to interact with each other. Thus an anomaly causing condition is a condition associated with a device/agent container/agent/service which causes an interaction between two or more agents to proceed contrary to the expectations of at least one of the agents participating or seeking to participate in the interaction.

The anomaly management scheme provides a plurality of application agents which are associated with an anomaly management agent, each anomaly management agent being assigned to a group of application agents in accordance with at least one load-balancing criterion for the MAS.

The term application agent is used herein to refer to all agents in a MAS which have the capability to be associated with a particular application.

The aspects of the invention and the preferred features of the invention are in addition described by the independent and dependent claims appended hereto.

Those skilled in the art will appreciate that the preferred features described above and in the dependent claims may be appropriately modified in any apparent manner known to those skilled in the art to be combined with other preferred features and/or other aspects of the invention and as described by the independent claims.

Embodiments of this invention will now be described with reference to the accompanying drawings which are by way of example only and in which:

FIG. 1 shows a schematic drawing of a MAS in which an anomaly management scheme is implemented according to an embodiment of the invention;

FIG. 2 of the accompanying drawings shows schematically the process wherein an application agent finds an anomaly management agent;

There follows a detailed description of the preferred embodiments of the invention, which include a description of the best mode of the invention as currently contemplated by the inventors. Even where not explicitly described, it will be apparent to those skilled in the art that certain features of the invention can be replaced by their known equivalents, and the scope of the invention is intended to include such apparent equivalents to the described features where appropriate.

Figure 1:
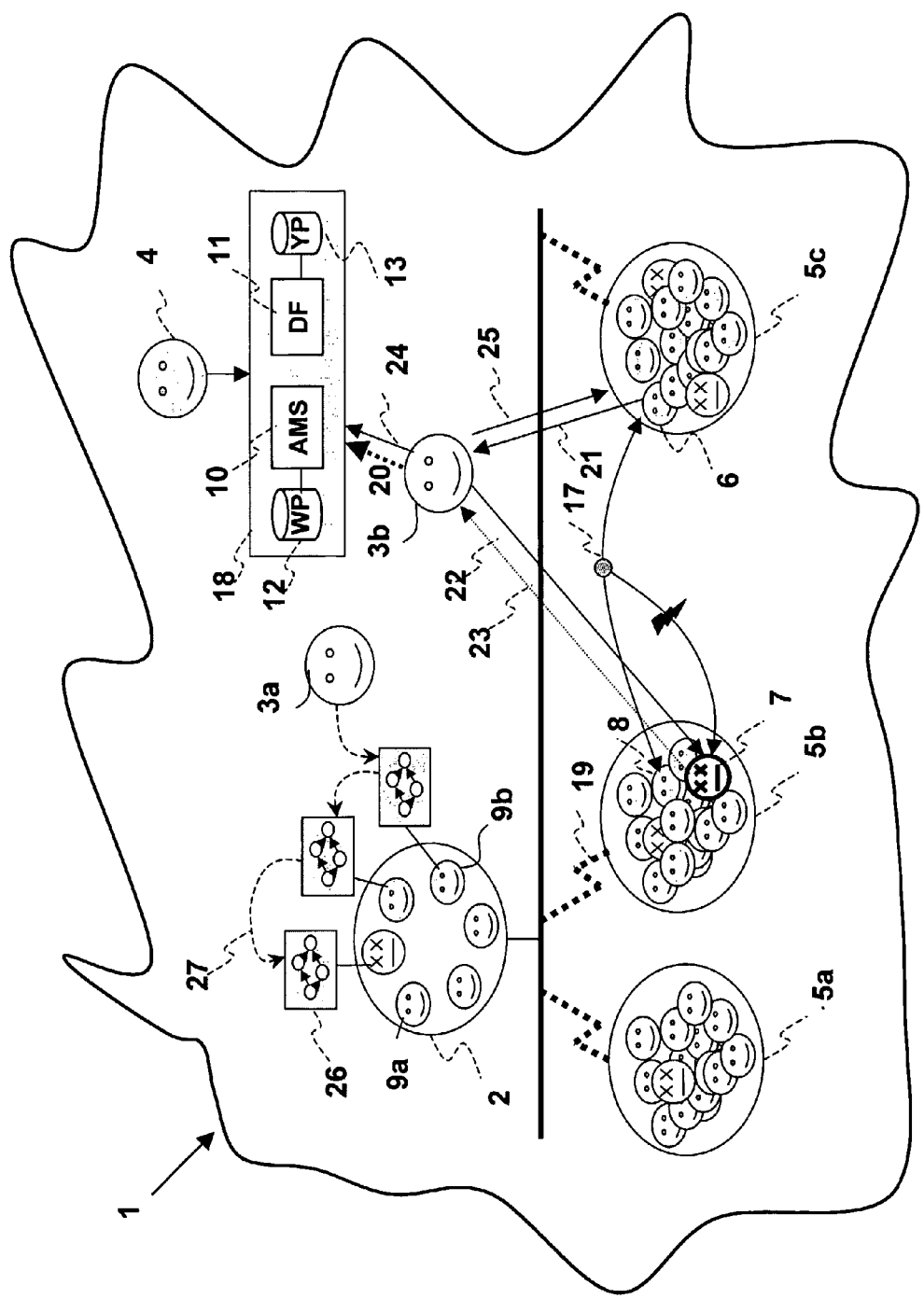

FIG. 1 shows schematically a MAS 1 in which an anomaly management scheme according to an embodiment of the invention is being implemented.

MAS 1 is populated by a large number of agents which provide a variety of services and perform a variety of roles within the MAS. However, for clarity, only a few agents are shown in FIG. 1. MAS 1 may be implemented within a single platform, however, in the best mode of the invention, the MAS 1 is distributed and is supported by a number of remotely located devices. The distributed MAS computing environment may comprise a number of appropriate devices, for example, mobile telephones, portable computers, personal digital assistant (PDA) type devices in one or more client domains. Thus an appropriate device is any device capable of connecting to a network for communication with one or more other devices. Typically a device within a client domain will be operated by a user who needs to interact with one or more other users via a communications network using one or more applications, or by a user who needs to interface with each one or more other applications supported by one or more servers within a distributed computing environment.

Referring again to FIG. 1 of the accompanying drawings, in this embodiment of the invention, MAS 1 supports several remotely located devices, one or more of which are operated by one or more users within a distributed system. The upper half of FIG. 1 represents the domain of the server support platform within the MAS system and the lower half of FIG. 1 represents the client domain of the MAS system.

Each device deployed within the client domain of the MAS supports one or more agent groups which are associated with an agent container supported by a server platform within the MAS. The MAS is thus supported by various platforms using appropriate network connections in each of the server and client domains.

FIG. 1 shows agent container 2 supported by a platform (not shown) in the server domain. Each agent container comprises at least one, but preferably a plurality of agents. Several server agents are associated with agent container 2, two of the server agents being denoted 9a, 9b in FIG. 1. Also shown in the server domain of FIG. 1 are anomaly management agents 3a, 3b. The agent container 2 is associated via an appropriate network link (for example a wireless communications link) with agent groups within the client domain, two of which are shown in the lower half of FIG. 1 (agent groups 5a, 5b). Each agent group comprises at least one, but preferably a plurality of agents. Each of the agent groups 5a, 5b is supported by an appropriate platform in the client domain, which they may share in some embodiments of the invention. For example, an application installed on a device providing a user interface and not shown in FIG. 1. One other agent group 5c is shown within the client domain in FIG. 1. Agent group 5c includes an application agent 6 and is supported by another device (not shown) located remotely from the device(s) supporting other agent groups 5a, 5b in the client domain.

The assignment in the MAS of anomaly management agents 3a, 3b to agents and agent groups is determined by one or more administration agents. Administration agent 4 shown in the server domain in FIG. 1 is responsible for the mapping of the anomaly management agents 3a, 3b to agent group 2 within the server domain. The administration agent enables both the anomaly management agents 3a, 3b to be associated with the application agents 7, 8 belonging to the agent container 2 using an appropriate load balancing rule specification. The load balancing rule for the MAS ensures that the number of anomaly management agents to application agents is maintained within an acceptable range, and an example of a load balancing rule specification is described in more detail later herein below.

As each agent group 5a, 5b, 5c preferably has at least two anomaly management agents in the server domain, at least one anomaly management agent 3a is able to remain associated with the agent groups 5a, 5b in the event of an anomaly occurring which requires another one of the anomaly management agents (for example, anomaly management agent 3b) to migrate or "move" to the client platform.

Also shown in the server domain of FIG. 1 is platform 18 which is used to store descriptive information about the agents in the MAS using appropriate agent location and service registries. All of the agents (server, client and anomaly management agents of MAS 1 are collectively registered and are associated with the agents of an agent management system (AMS) system and a directory facilitator (DF) provided on platform 18, which enables the MAS to be compliant with MAS standard FIPA (Foundation for Intelligent Physical Agents, see http://www.fipa.org). Thus all agents within main container 2 are associated with the AMS agent 10 and DF agent 11.

The AMS agent 10 maps agent names with their physical addresses and the DF agent 11 maps agent names to their services. In the FIPA compliant embodiment of the invention, the mappings are implemented by the AMS agent 11 maintaining a location directory 12 (known as a "white pages service" in FIPA standard specification terminology) that contains the mappings between the names of application agents and their physical addresses. The DF agent 11 maintains a service directory 13 (known as a "yellow pages service" in FIPA terminology) that contains the mappings between agent names and their services as shown in FIG. 1. Each application agent 6, 7, 8 is also assigned to a group number that identifies to which group they belong and are registered to.

Each anomaly management agent (such as anomaly management agents 3a, 3b shown in FIG. 1) advertises its service description (for example, by using a DFAgentDescription) by sending an appropriate communication 20 to the DF agent 11 in order to register the service the anomaly management agent provides in the service registry 13 (for example, to register the DF AgentDescription into a FIPA yellow pages service). An example of a DFAgentDescription of an anomaly management agent is provided in pseudo code for a specific embodiment of the invention, which incorporates the FIFA standard terminology, is given below:

```
<DFAgentDescription>
    <Name>
    <Agent-Identifier name=sentinel-1@foo.com,
    address="iiop://foo.com/acc" />
    </Name>
    <Protocol name="FIPA-Request" />
    <Ontology name="AgentFaultManagement" />
    <Language name="FIPA-SL0" />
    <Language name="KIF" />
    <ServiceDescription>
    <Name>FaultManagement</Name>
    <Type>AgentAdministration</Type>
    <Ontology>"AgentFaultManagement"</Ontology>
    <Property name="group-id", value="1:2"/>
    </ServiceDescription>
</DFAgentDescription>
```

According to FIPA, a DFAgentDescription is supposed to contain an agent name (represented by the <Name> tag), one or more ontologies (represented by the <Ontology> tag), one or more protocols (represented by the <Protocol> tag), one or more languages (represented by the <Language> tag) that the agent can understand, and finally one or more service descriptions (represented by the <ServiceDescription> tag) the agent is supposed to provide.

Thus the above pseudo code provides a description of an anomaly management agent named "sentinel-1@foo.com" whose anomaly fault management service has been given the name "FaultManagement". The service type is "AgentAdministration" and the details of the service are defined in "AgentFaultManagement" ontology. Furthermore, the service has a property named "group-id" which is used to denote the group identifier of the anomaly management agent that is responsible for the anomaly management service named "FaultManagement" in the DFAgentDescription above.

Those skilled in the art will appreciate that the anomaly management scheme described extends to agent interactions where all the agents are provided within the server domain, as well as agent interactions in which all the agent are within the client domain and agent interactions where one or more agent are located in the client domain and one or more agents are located in the server domain.

The embodiment of the invention shown in FIG. 1 will now be described in the case where two agents associated with applications in the client domain attempt to participate in an interaction. An example of an anomaly management scheme according to this embodiment of the invention is described below in the context of application agent 6 of agent group 5c when it seeks to participate in an interaction with application agents 7, 8 associated with agent group 5b. It will be assumed that the interaction between the agents exhibits an anomaly arising from a condition affecting application agent 7 within agent group 5b for the purposes of explaining the anomaly management process for MAS 1. The cause of the anomaly in the interaction may arise from one or more conditions affecting application agent 7, for example, the anomaly may be derived from a condition (such as a fault) associated with the device on which application agent 7 is located, and/or from a condition (such as a fault) associated with the agent group 5c to which application 7 belongs, and/or from a condition (such as a fault) associated with application agent 7 itself and/or a condition (such as a fault) associated with the service associated with the application agent.

The agent which initiates an interaction with another agent will usually be the first to detect any anomaly in the interaction and to refer the other agent to an anomaly management agent. However, in alternative embodiments of the invention, it is possible for an agent having a responding role in an interaction to determine an anomaly has occurred in the interaction and for the responding agent to refer an initiating agent to an anomaly management agent.

In the embodiment of the invention described below, the term referring agent 6 is used synonymously for the application agent 6 which is initiating the interaction with application agents 7, 8 shown in FIG. 1 and the term referred agent 7 is used synonymously for the application agent 7 which is reported by the referring agent 6 to an anomaly management agent 3b. Thus in FIG. 1, referring agent 6 sends a report 21 identifying referred agent 7 to the anomaly management agent 3b which has been associated with the referred agent 7. The method by which the referring agent 6 is able to determine an appropriate anomaly management agent to send the report to is discussed in more detail below with reference to FIG. 2.

Once an appropriate anomaly management agent 3b is determined by the referring agent, the condition(s) causing the anomaly in the interaction can be diagnosed by the anomaly management agent 3b and once diagnosed, the condition(s) may be remedied by the anomaly management agent 3b. Thus in FIG. 1, the anomaly management agent 3b then sends one or more test messages 22 to determine if a condition exists associated with the device and/or with the agent container of referred agent 7 and/or with the referred agent 7 itself, and/or with the service of the referred agent. Depending on what response 23, if any, is received to each test message 22, the anomaly management agent 3b may need to query and/or update the directory facilities 24 to remedy the condition(s) causing the anomalous interaction, and provide a feedback message 25 to the referring agent 6.

The detection and recovery of the anomaly of server agents by anomaly management agent may be done using any suitable state log based approach (for one example, see Ogunleye, L.: "The state detection of a multi-agent system," Working Paper, Department of Computer Science, University of Saskatchewan, Canada). This enables, for example, each server agent 9b to be designed to log its internal state 26 in a local device periodically. Later, an anomaly management agent 3a migrates to the device where the server agent 9b is located, and the anomaly management agent 3a may check the log 26 to decide whether the server agent 9b is operating correctly. The anomaly management agent 3a may migrate 27 to another server agent to perform the same job for anomaly detection.

Figure 2:
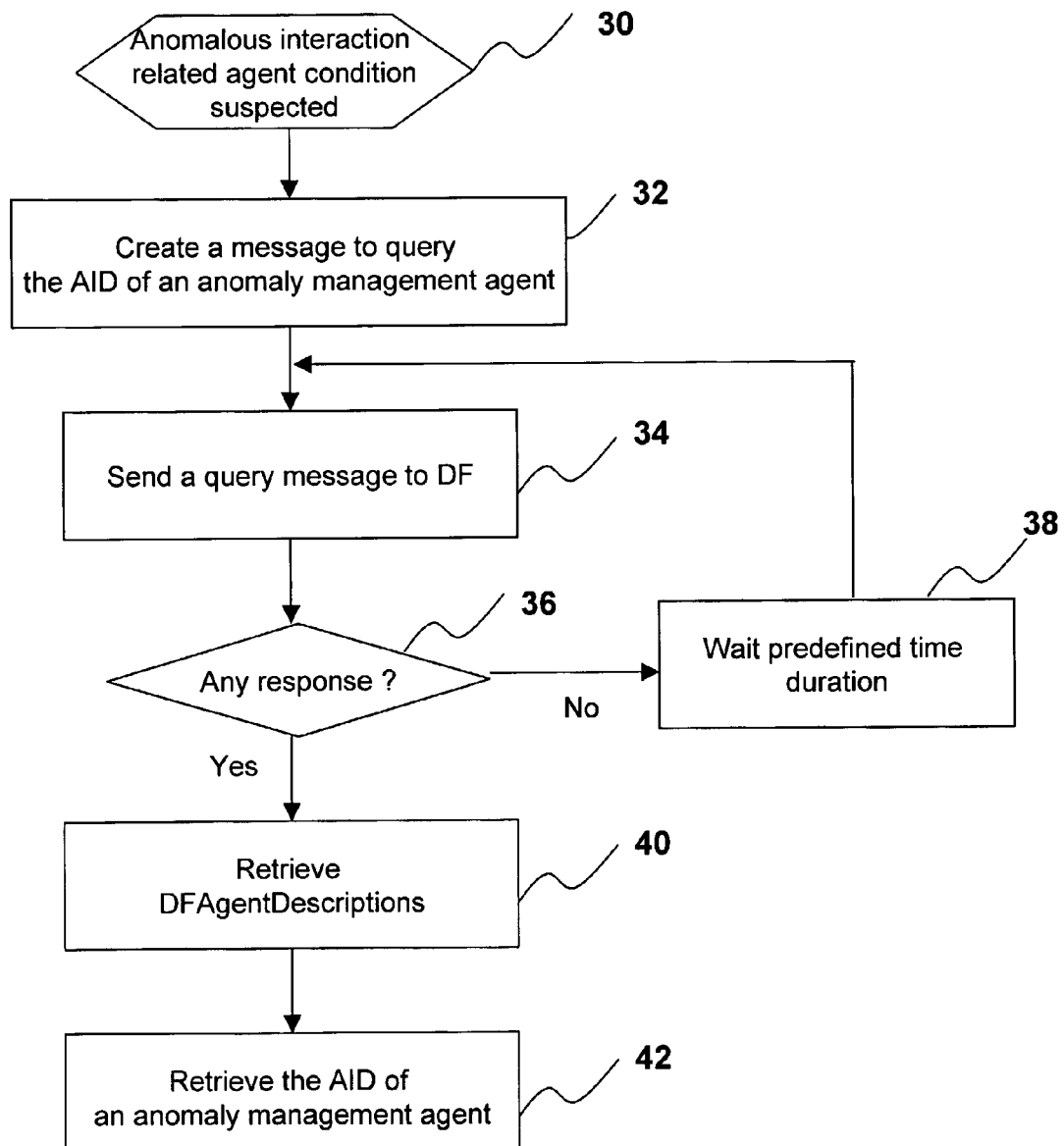

FIG. 2 of the accompanying drawings shows schematically in more detail the process wherein referring agent 6 of FIG. 1 finds an anomaly management agent 3b to refer other agent 7 too. In FIG. 1, the referring agent 6 initiates the referral process when it determines an anomaly has occurred in the interaction or which has prevented the interaction with the referred agent 7. In the anomaly management scheme provided by the invention, an anomaly prevents the interaction or causes the interaction to proceed in a manner which does not meet the expectations of the referring agent, such as a fault associated with the other agent, or its device, agent container, or service.

In FIG. 2, referring agent 6 first determines from its interaction or attempted interaction with referred agent 7, that the referred agent 7 may have a condition which prevented the interaction from meeting the expectations of referring agent 6 (step 30). The referring agent 6 then creates a query message (step 32) that is sent to a DF agent 11 (step 34). The query message contains the service description as described herein above, with the exception that the value of the property "group-id" contains the group identifier the referring agent 6 has been assigned.

On receiving the query message, the DF agent 11 searches its DF registry (step 34). If the search locates any DFAgentDescriptions that match with the service description contained in the query message, the DF agent 11 sends the DFAgentDescriptions back to the referring agent 6 in a response message. If the referring agent 6 doesn't receive a response message from the DF agent 11, it waits (step 36) a predefined time duration (for example, which may be determined by a system administrator) and re-sends a query message to the DF agent 11 later (step 38).

Once the referring agent 6 receives a response messages from the DF agent 11, it retrieves the DFAgentDescriptions from the response message (step 40) and finds the AID of an anomaly management agent 3b that is responsible for the group the referring agent 6 belongs (step 42). The AID contains the agent identifier and address of the device the anomaly management agent is located on.

As described above a DFAgentDescription will also contain a service description which contains a group number for the agent group 2 for which the anomaly management agent 3b is responsible. This enables a flexible dispatch of anomaly management agents to each agent group. For example, an anomaly management agent is able to change its duty group by changing its service description with different group number when the number of application agents in its current group is relatively smaller than the new group.

In one embodiment of this invention, the assignment of anomaly management agents to agent groups is implemented using an administration agent 4 (see FIG. 1) using a dispatching rule.

Figure 3:
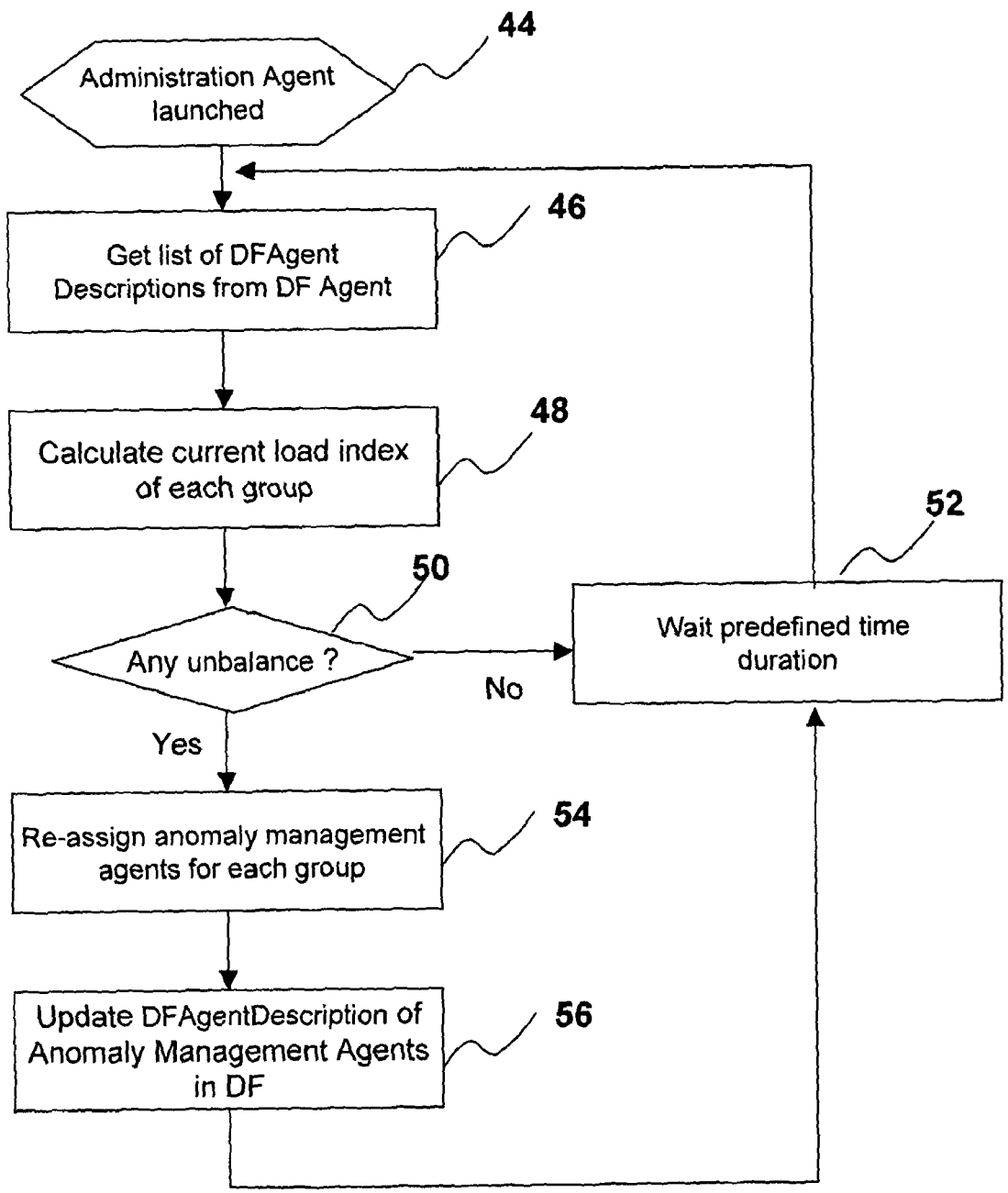
FIG. 3 shows schematically the process wherein an administration agent performs load balancing for anomaly management agents.

FIG. 3 shows schematically the process wherein an administration agent performs load balancing for anomaly management agents.

Referring now to FIG. 3, an administration agent 4 starts its work when it is launched in a main container 2 (step 44). Firstly, it contacts a DF agent 11 to get a list of all the DFAgentDescriptions registered by application agents and anomaly management agents (step 46). Based on this list, the administration agent 4 calculates the current load index of each group (step 46). A load index indicates how many anomaly management agents are serving the anomaly management service for how many application agents in each group. The load index value of each group is compared with the desired value in a load balancing rule (for example which is stored in an XML file that may be dynamically modified by a system administrator).

An example specification of a load balancing rule is shown below in pseudo code:

```
<LoadBalancingRule>
    <NOSA>
        <MinSA>1</MinSA>
        <MaxSA>1</MaxSA>
        <MinGroup>1</MinGroup>
        <MaxGroup>5</MaxGroup>
    </NOSA>
    <NOSA>
        <MinSA>2</MinSA>
        <MaxSA>3</MaxSA>
        <MinGroup>6</MinGroup>
        <MaxGroup>10</MaxGroup>
    </NOSA>
    <NOSA>
        <MinSA>2</MinSA>
        <MaxSA>4</MaxSA>
        <MinGroup>11</MinGroup>
        <MaxGroup>15</MaxGroup>
    </NOSA>
    <RecruitCriteria>LongestIdlingAgent</RecruitCriteria>
</LoadBalancingRule>
```

As shown above, one embodiment of a load balancing rule comprises of <NOSA> and <RecruitCriteria> tags. A <NOSA> tag contains the number of anomaly management agents for each group size. For example, as shown in the above embodiment of a load balancing rule, a desirable number of anomaly management agents for the group whose size is between 1 and 5 can be specified as 1. A <NOSA> tag (representing the number of anomaly management agent) consists of a <MinSA> tag (representing the minimum number of anomaly management agents), a <MaxSA> tag (representing the maximum number of anomaly management agents), a <MinGroup> tag (representing the minimum group size), and a <MaxGroup> tag (representing the maximum group size). The <RecruitCriteria> tag is used to specify the criteria to determine the anomaly management agents that should be re-assigned to other unbalanced groups. In this example, the criteria is specified as "LongestIdlingAgent" that means the anomaly management agents that have been idle for the longest time duration among the anomaly management agents which are serving a surplus group (that has too many anomaly management agent) should be moved to another overloaded group (that has too small anomaly management agent).

Referring again to FIG. 3, if the current load balancing among all groups is fine, the administration agent 4 waits for predefined time duration (step 50) and then restarts the checking process (step 52). If there are any groups that have unbalanced load indexes, the administration agent 4 re-assigns the surplus anomaly management agents to overloaded group based on the recruit criteria (step 54). Finally, the administration agent 4 modifies the service descriptions of reassigned anomaly management agents and updates the registry of DF agent 11 (step 56).

Within the MAS, the various types of inter-agent interaction include: intra-application interactions such as client-agent server-agent interactions or a plurality of inter-client agent interactions; and interactions between an application agent (client or server) and an anomaly management agent. Within each of these differing types of interactions, anomaly identification will now be described.

Referring again to FIG. 1, consider a scenario where application agent 6 within user agent group 5c is initiating an interaction with application agent 7 within user agent group 5b. For example, application agent 6 may have obtained the address of two other agents 7, 8 from the DF agent 11 in order to co-ordinate with agents 7, 8 during a particular operation, for example, during a job trade such as is described in Habin Lee, Patrik Mihailescu, and John Shepherdson, A Multi-Agent System to Support Team-based Job Management in a Telecommunications Service Environment, TI Lab Journal Exp, 3 (3), 96-105, 2003, the contents of which are hereby incorporated by reference.

Application agent 6 functions as the initiator agent and sends a CFP (call for proposal) message to the other agent 7 and the other agent 8 within user group 5b via the network. This creates interaction instance 17 between the three agents 6, 7, 8.

The other agent 7 does not respond to the CFP message with a response conforming to one or more criteria which a response to the initiating agent should conform to. For example, application agent 6 may not receive a response within a predetermined period of time (i.e., the response is timed-out), during the interaction between the agents 6 and 7. This will represent an anomaly in the interaction from the perspective of application agent 6 and will initiate an agent referral process to report the other agent 7 to anomaly management agent 3b. Application agent 6 then determines using the method described above in reference to FIG. 2 the identity of the anomaly management agent to which a report concerning the referred application agent 7 should be sent to.

Once the appropriate anomaly management agent has been identified, a report is sent by the referring agent 6 (e.g. to the identified anomaly management agent). The report provides sufficient information for the diagnosis of the cause of the anomalous interaction to be eventually determined (for example, it should contain enough information for the anomaly management agent to instigate an investigation as to the cause of the anomaly). Accordingly, the referred agent 7 is identified in the report along with other information such as, for example, the type of anomaly which was determined to have occurred in the interaction or which prevented the interaction from taking place between the two agents. An example of information to be included in a report according to one embodiment of the invention is given below in pseudo code:

```
<FaultReport>
    <Reporter>butler@foo.com</Reporter>
    <AID>gilbert@foo.com</AID>
    <Time>12/11/2003 12:10:00</Time>
    <Fault>
        <Type>NoResponse</Type>
        <Service>
            <Name>MiniJobTrade</Name>
            <Type>TeamworkCoordination</Type>
            <Role>JobTaker</Role>
            <TargetTask>PrepareBid</TargetTask>
        </Service>
    </Fault>
</FaultReport>
```

The report shown above in pseudo code contains an indicator of the origin of the report, for example by using a <Reporter> tag which represents the reporting agent generating the anomaly report. This information is used to return the diagnosis result back to the reporter. The report identifies the referred agent 7, for example using an <AID> tag which contains the reported agent ID (to identify the agent associated with the anomaly which is being referred for anomaly management (i.e. to identify the agent which is suspected to be faulty)). A <Time> tag which represents the times that the report has been created, and a <Fault> tag which provides more information about the interaction anomaly to enable the suspected anomaly condition associated with the referred agent which has caused the anomalous interaction to be more easily deduced. The <Fault> tag provides information related to the anomaly type and corresponding service information. The <Type> tag contains the information about the external appearance of the referred agent. A number of <Fault> Types tags may be defined, each representing a specific interaction anomaly. Examples of possible Fault Types include: NoResponse; VoidResponse; Orphan; and Failure.

A "no response" indicates a referred agent did not respond within an expected time out duration. A "void response" indicates a referred agent sent back a response that did not make sense to the referring agent. The "orphan" fault type indicates an agent can not re-connect to its main platform after a temporal disconnection. The orphan fault type is handled by an anomaly management agent to re-register the AID of the orphan agent in the location directory 12 of the AMS agent 10. The "failure" fault type means that a referring application agent has received failure messages consecutively from a referred agent more than a number of acceptable predefined times.

As has been described already, each application agent is assigned with a group number representing the group in which the application agent belongs. For example, the application agent 6 shown in FIG. 1 belongs in agent group number 5*c* and could be assigned group number "#5*c*" for example. An anomaly management agent advertises its service description to the DF agent 11 that registers the service into its service registry. The service description provides an indication of the agent group for which the anomaly management agent is responsible, for example anomaly management agent 3*b* is responsible for agent group 5*c*.

By registering a description of each anomaly management agent's services, an anomaly management agent can be dispatched in a flexible manner to an agent group to maintain a balanced load of application agents for each anomaly management agent within the MAS. This enables, for example, an anomaly management agent to change its duty group by changing its service description with different group number when the number of application agents in its current group is relatively smaller than the new group.

Anomaly Diagnosis

An anomaly may arise from a number of conditions, for example, faults, which can be classified according to their domain of origin. For example, in one embodiment of the invention an anomaly causing condition can be classified into one or more of four categories: a device fault, an agent container fault, an agent fault, and service level fault.

Device faults include any faults caused by the failure of a device where agents are located. Agent container faults include any faults caused by the malfunctioning of an agent container while a device where the agent container is locating is working correctly. Agent faults include any faults caused by a malfunctioning agent while the agent container and device where the agent is located are working correctly. Finally, service level faults include any system failures caused by a malfunctioning service component of an agent if the agent, the agent container, and the device where the service component is deployed are otherwise working correctly.

Once an anomaly report arrives, an anomaly management agent performs one or more predefined tests to diagnose the cause of the reported anomaly, for example, a basic test can be performed to classify the reported anomaly as one of device, container, agent level fault or other form of anomaly. If the anomaly management agent cannot classify the reported anomaly as one of the three anomaly types via this basic test, the anomaly management agent can perform a service test to determine if the reported anomaly is instead caused by a condition causing an anomaly associated with the service (for example, the failure of the service). It is possible in some embodiments of the invention for the order of the tests may be changed, for example, it is possible to perform a service test prior to investigating whether the anomaly is derived from a condition associated with the device, agent container or agent.

Device, Container and Agent Level Anomaly Determination

Figure 4:
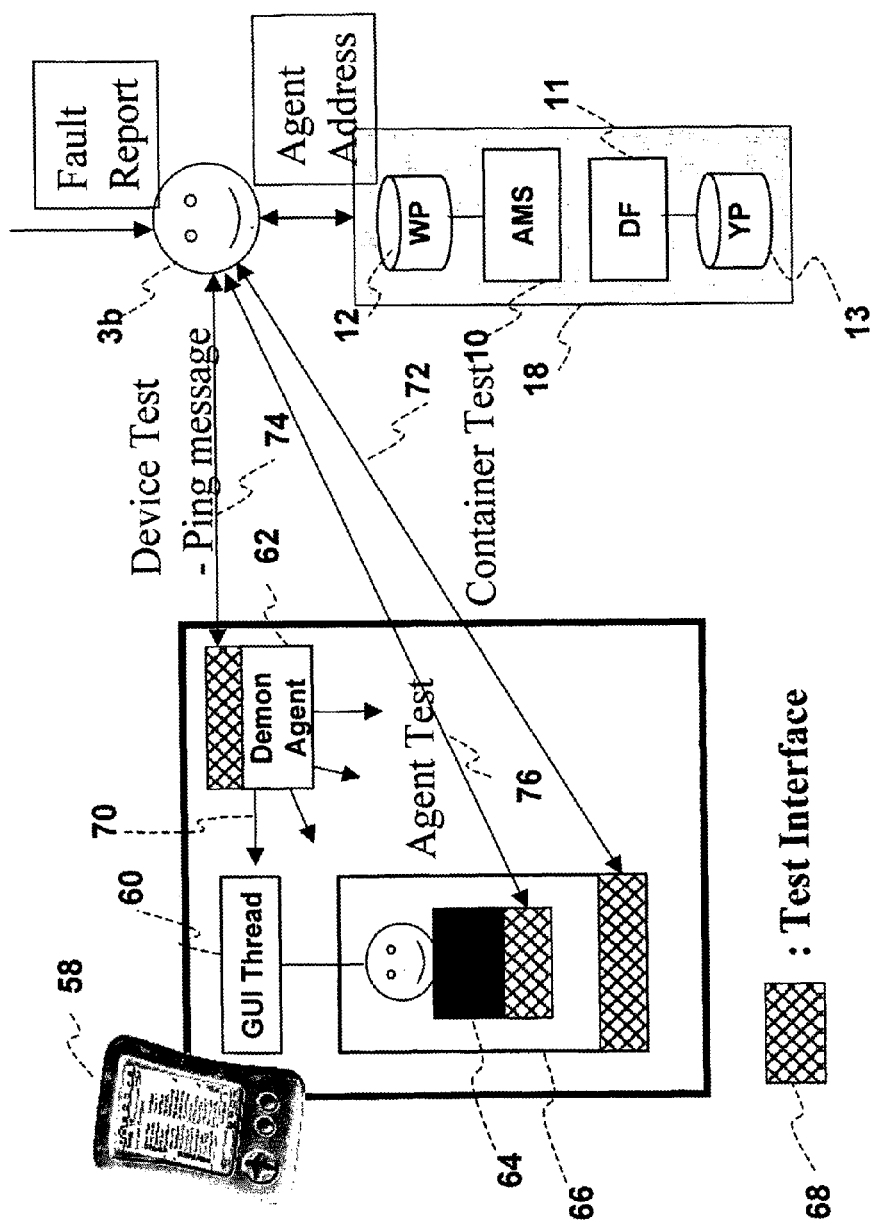
FIG. 4 shows an embodiment of a MAS in which a method of anomaly diagnosis and anomaly management according to one embodiment of the invention can be implemented.

In the embodiment of the invention shown in FIG. 4, a user operated device 58 is shown, for example, a mobile device such as a PDA. The device 58 supports an application having an agent container 66 located on the device 58. In the embodiment shown in FIG. 4, the referred agent 7 is running in the agent container 66, and if an anomaly had not occurred, the referred agent 7 would support one or more services to be provided by the agent container 66.

If no anomaly had occurred in the interaction, the user of the device 58 would be able to interact with the agent 7 via a suitable interface, for example, a GUI (graphic user interface) program 60. The device 58 is also provided with an appropriate agent configured to receive input packets, for example, a demon agent 70 located on the device 58 independently of agent container 66.

Also shown in FIG. 4 is the platform 18 supporting the location and service directory facilities which provides the AMS agent 10, the DF agent 11 and the respective service directory facility 13 and location directory facility 12.

Figure 5:
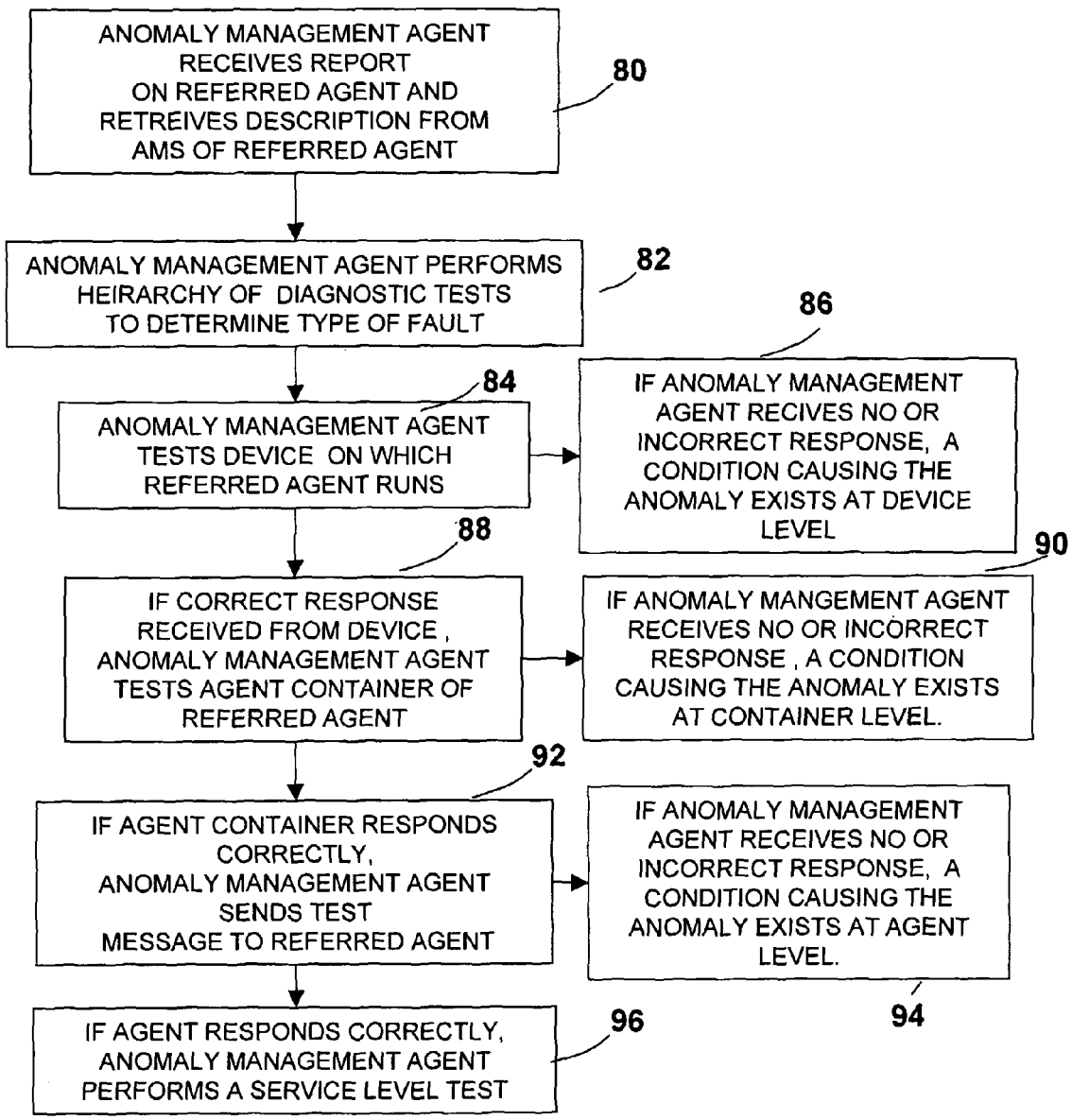
FIG. 5 shows steps in a method of anomaly management according one embodiment of the invention for the MAS shown in FIG. 4.

Consider the case where anomaly management agent 3*b* has received a report from a referring agent 6 (not shown in FIG. 5). Referring now to FIGS. 4 and 5 of the accompanying drawings, a method of anomaly diagnosis according to the invention performed by the anomaly management agent 3*b* will now be described in which the anomaly management agent 3*b* performs a series of tests within the architecture of the MAS.

According to one embodiment of the invention shown in FIG. 5, the anomaly management agent receiving a report of a referred agent from a referring agent retrieves an agent description from the AMS (see FIG. 5) (step 80). The retrieved agent description contains sufficient information to enable the anomaly management agent to determine the IP address of the device within which the referred agent is located and the port number of an agent within the device which is configured to receive input packets, for example, demon agent 70. Once the anomaly management agent has identified an appropriate demon agent via which to communicate with the device associated with the referred agent, the anomaly management agent performs a series of diagnostic tests (step 82). The series of tests can be considered to form a hierarchy of tests which probe the referred agent at different levels (firstly at the device level, then at the agent container level, then at the agent level) and also at the service level.

Using the agent description information, the anomaly management agent performs a device test by sending a test message 74 to the demon agent 70 that locates the target device where the referred agent is supposed to be running (step 84).

If the demon agent 70 does not respond to this test message, the anomaly management agent marks the reported fault as a device level fault (step 86). Otherwise, the anomaly management agent marks that the device is working correctly and performs a container test wherein the anomaly management agent sends a test message 72 to the agent container 66 (step 88). If the agent container 66 does not respond correctly, the anomaly management agent marks the reported fault as a container level fault (step 90). Otherwise, the anomaly management agent marks that the agent container 66 is working correctly and performs an agent test wherein the anomaly management agent sends a test message (76) to the referred agent 7 (step 92). If the referred agent 7 does not respond correctly against the test message, the anomaly management agent 3b marks the reported fault as an agent level fault (step 94). Otherwise, the anomaly management agent 3b marks that the referred agent 7 is working correctly and performs a service level test (step 96).

Figure 6:
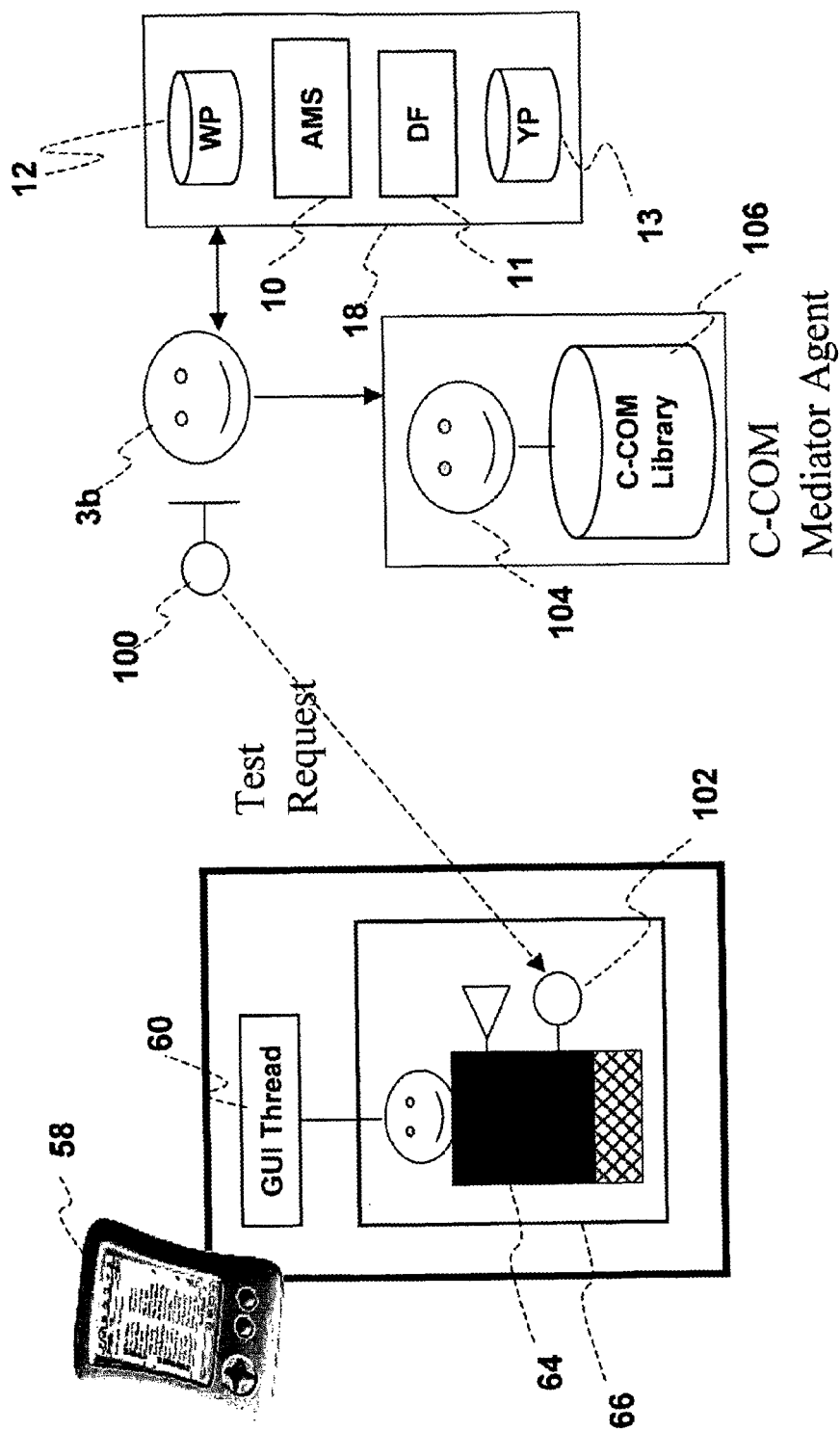
FIG. 6 shows another embodiment of a MAS for which a method of anomaly management according to another embodiment of the invention can be implemented.

A service level test 96 according to an embodiment of the inventing will now be described with reference to FIGS. 6 and 7 of the accompanying drawings. In FIG. 6 like elements to the elements shown in earlier Figures retain their numbering scheme.

Figure 7:
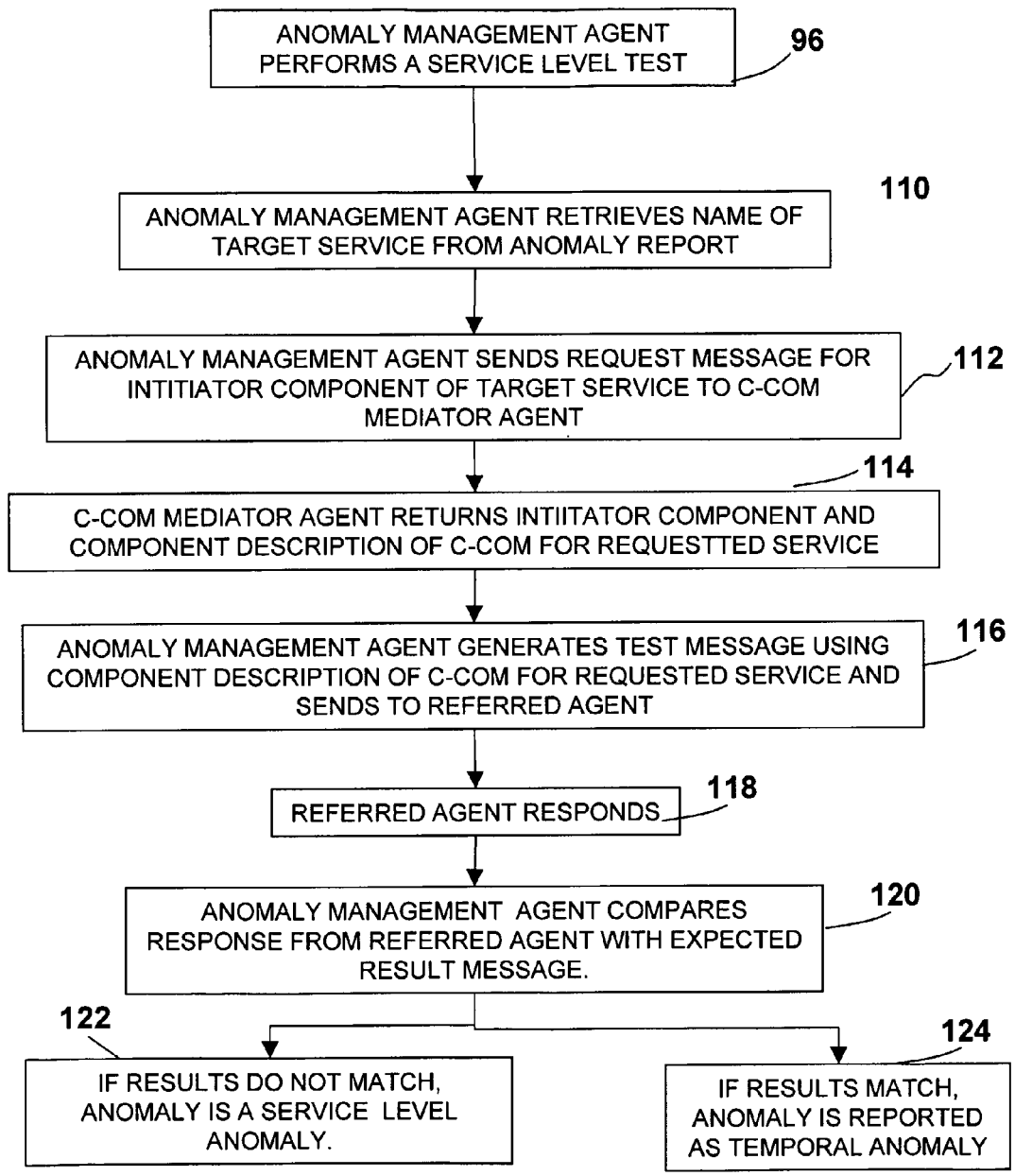
FIG. 7 shows steps in a method of anomaly management comprising another embodiment of the invention for the MAS shown in FIG. 6.

In FIGS. 6 and 7, anomaly management agent 3b contacts DF agent 11 to get the agent description of a referred service component agent (for example, a C-COM agent) and a service component mediator agent 104 (for example, a C-COM mediator agent) (see step 110). The term C-COM agent refers to any agent having self-descriptive properties and having one or more software components. For example, executable software components providing roles, particularly roles which implement the agent's interactions with other agents (also referred to herein for example, as C-COM software components). A C-COM software component is a service component which enables two or more agents to interact with each other to transact a service. As such, the term C-COM is used in this embodiment as a synecdoche for equivalent service components which can be implemented using other suitable service component schemes known to those skilled in the art. The service component C-COM agents and C-COM mediator agents are described in more detail in Habin Lee, Patrik Mihailescu, and John Shepherdson, "mPower—a component-based development framework for multi-agent systems to support business processes", BT Technology Journal, 21 (4), 92-103, 2003, and in the inventors' co-pending PCT patent application entitled "Flexible Multi-Agent System Architecture", a copy of which is filed herewith, the contents of which are hereby incorporated by reference.

As shown in FIG. 6, a service component (C-COM) mediator agent 104 maintains all the service components (C-COMs) used in an MAS application in a service component (C-COM) library 106. A service consumer agent installs an Initiator component of a (C-COM) to request a service, and a service provider agent installs a Respondent component (of the C-COM) to provide the service.

FIG. 7 shows steps in a method of performing a service level test in which once a service level test has been requested (step 96), the anomaly management agent contacts the DF agent 11 to retrieve the agent description of the C-COM agent and C-COM mediator agent (steps 112, 114). The anomaly management agent then retrieves the service component (C-COM) initiator and component description of the C-COM itself from the mediator agent (step 116). The composition of the query message to the DF agent 11 is based on the information of an anomaly report (especially, the target service part). The anomaly management agent 3b retrieves the name of the target service from the anomaly report (110), and sends a request message for the Initiator component of the target service to the C-COM mediator agent 104 (step 112). With the response message of the request message, the C-COM mediator agent 104 returns the Initiator component 100 and the component description of a C-COM for the requested service (step 114).

The component description contains information relating to appropriate test data for that service. For example, the component description many contain test data relating to a scenario in which if an Initiator component sends 'X' as an input, the respondent component will respond with 'Y'. Based on the component description, an anomaly management agent 3b prepares a test message (step 116). Then, the anomaly management agent sends the test message to the referred agent by executing the received Initiator component 100 (step 116). The referred agent responds with a response message (step 118). The anomaly management agent 3b compares the response message from the referred agent 7 with the expected result message (step 120). If the response message matches with the expected result message, the anomaly management agent 3b marks the reported anomaly as a temporal anomaly (for example, a temporal fault) (step 124). Otherwise, the anomaly management agent 3b marks the reported anomaly as a service level anomaly (step 122).

Once the anomaly type has been identified via the anomaly diagnosis process, the anomaly management agent 1 starts an anomaly management process to remedy the condition causing the anomaly. Each anomaly type requires a different anomaly management process. For example, if a reported anomaly originates from a condition associated with the device of the referred agent, such as a device level fault, the anomaly management agent returns a feedback report to the original referring agent indicating the anomaly type. This enables the referring agent to terminate the interaction with the referred agent. Alternatively, or additionally, if a reported anomaly originates from a condition associated with a service of the referred agent, such as for example, a service level fault, the anomaly management agent sends a notification message to the referred agent to enable the referred agent to re-install the one or more service components having the condition causing the anomaly. For example, the referred agent may need to reinstall its Respondent component 102 by contacting the C-COM mediator agent 104.

Figure 8:
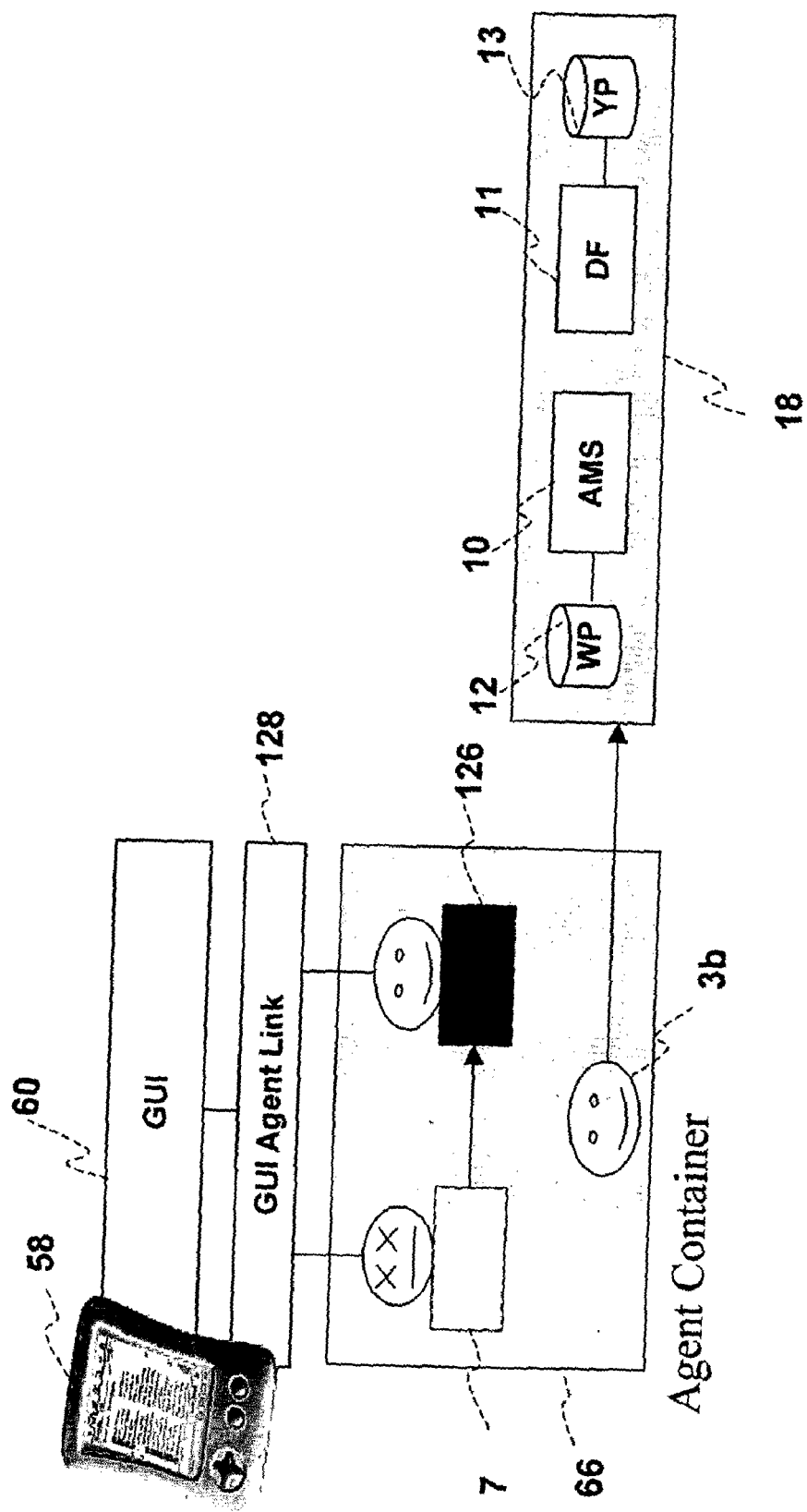
FIG. 8 shows another embodiment of a MAS for which a method of anomaly management according to the invention can be implemented.

Referring now to FIG. 8, the anomaly management process when an anomaly is caused by a condition associated with an agent, for example, such as an agent level fault, is shown schematically. Elements previously referred to in the drawings retain their numbering scheme in FIG. 8.

In FIG. 8, the device 58 is provided with a user interface 60, for example a GUI, which has an appropriate interface agent link 128 with agent container 66. The referred agent 7 whose address is within the domain of the agent container 66, and an anomaly management agent 3b whose address is also within the domain of the agent container 66 are also shown. Anomaly management agent 3b is capable of communicating with the platform 18 supporting the directory facility, which provides support for the AMS agent 10 (associated with the location directory 12 (provided by a white pages service in a FIPA embodiment of the invention) and the directory facility DF agent 11 (associated with the service directory facility 13, provided by a yellow page service in a FIPA embodiment of the invention). AMS agent 10 and DF agent 11 associate the anomaly management agent 3b with main agent container 2.

Figure 9:
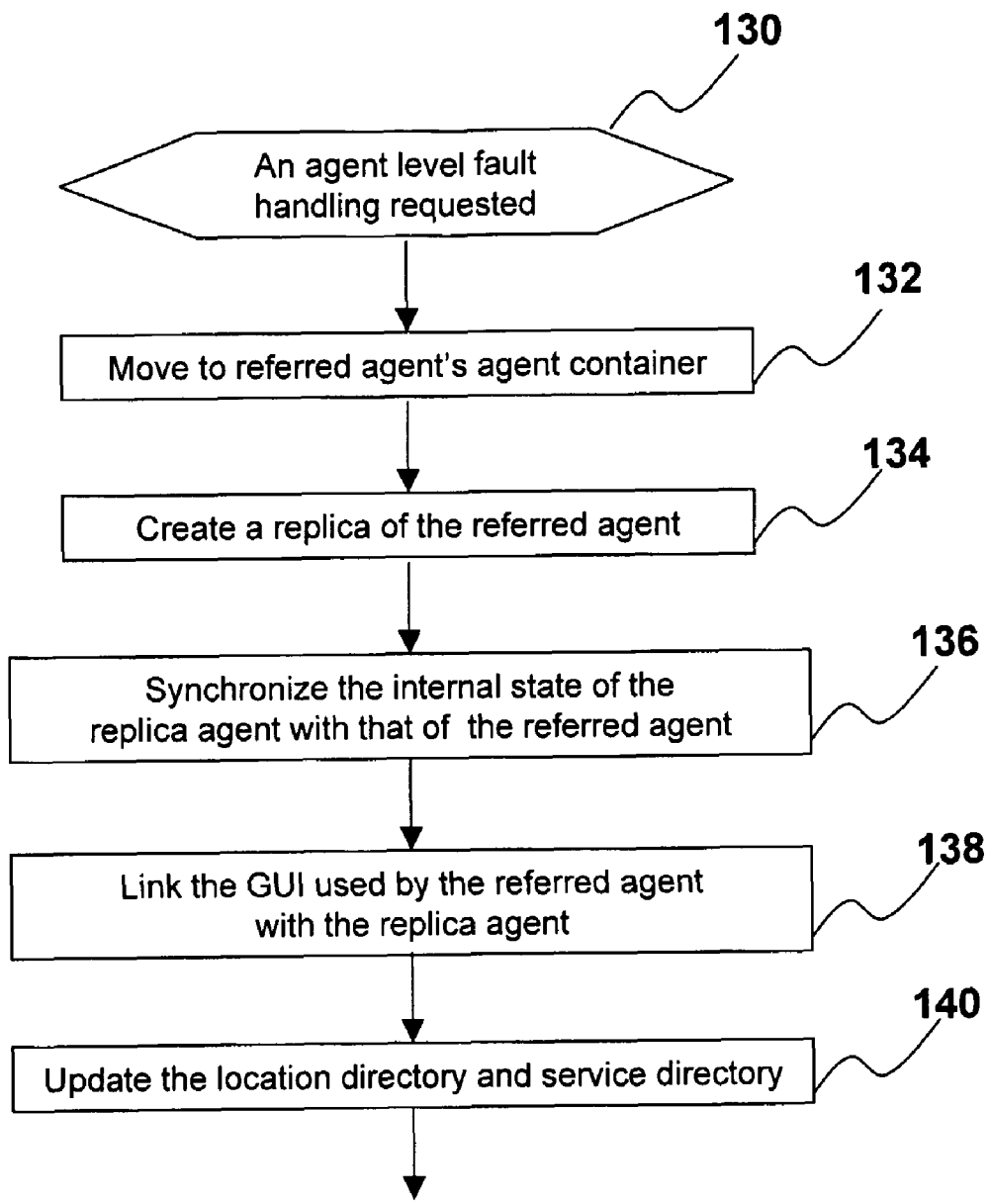
FIG. 9 shows steps in a method of anomaly management in another embodiment of the invention for the MAS shown in FIG. 8.

FIG. 9 shows steps in a method of resolving an anomaly associated with a condition associated with an agent, such as, for example, an agent level fault. The method will also be described with reference also to features shown in FIG. 10.

Figure 10:
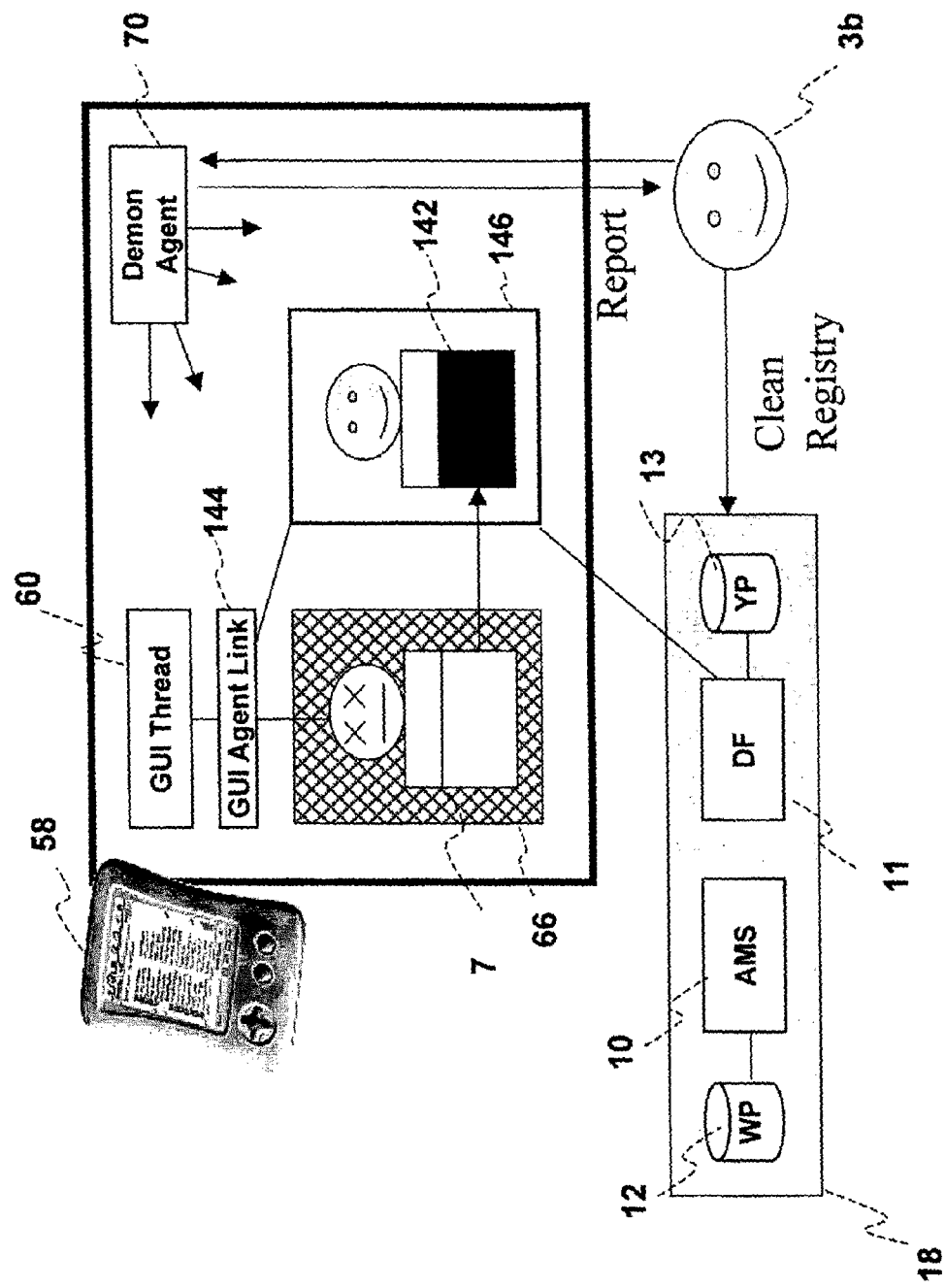
FIG. 10 shows another embodiment of an MAS for which a method of anomaly management according to the invention can be implemented.

In FIG. 10, a user operated device 58 is provided with a user interface 60. A referred agent 7 associated with agent container 66 is also supported by device 58. A demon agent 70 is also located on the user's device and is arranged to communicate with external entities, such as anomaly management agent 3b. As described herein before, the anomaly management agent 3b is arranged to communicate with an AMS 10 and DF 11 located on a main platform 18 which is located remotely from the user operated device 58. Main platform 18 supports an AMS 10 and associated location directory facility 12 and the directory facilitator 11 which has associated service directory facility 13.

When an agent level anomaly is suspected an internal request is made by the anomaly management agent (step 130) in order to perform the method of resolving the agent level fault. The anomaly management agent 3b then changes its domain to within the agent container 66 in which the referred agent 7 is located (step 132). In the agent container 66, the anomaly management agent 3b creates a replica agent 142 (see FIG. 10) of the referred agent 7 (step 134). Then, the internal state of the referred agent 7 is transferred to the replica agent 142 (step 136).

Referring now to FIG. 10 of the accompanying drawings, once the creation of the replica agent 142 is successful, the anomaly management agent 3b updates the GUI Agent Link Registry 144. First, the anomaly management agent 3b removes the mapping between the GUI 144 on the device with the referred agent 7 and links the GUI 144 with the new replica agent 142 (step 138 in FIG. 9). By doing this, the replica agent 142 can interact with human users via the GUI 144. Secondly, the anomaly management agent 3b contacts the main platform 18 to update the location directory 12 (for example, as provided by a white page in a FIFA system) and the service directory 13 (for example, as provided by a yellow age in a FIFA system). This removes the registry items for the referred agent 7 while one or more new registry items for the new replica agent 144 are added (step 140).

Agent Container Level Anomalies

Figure 11:
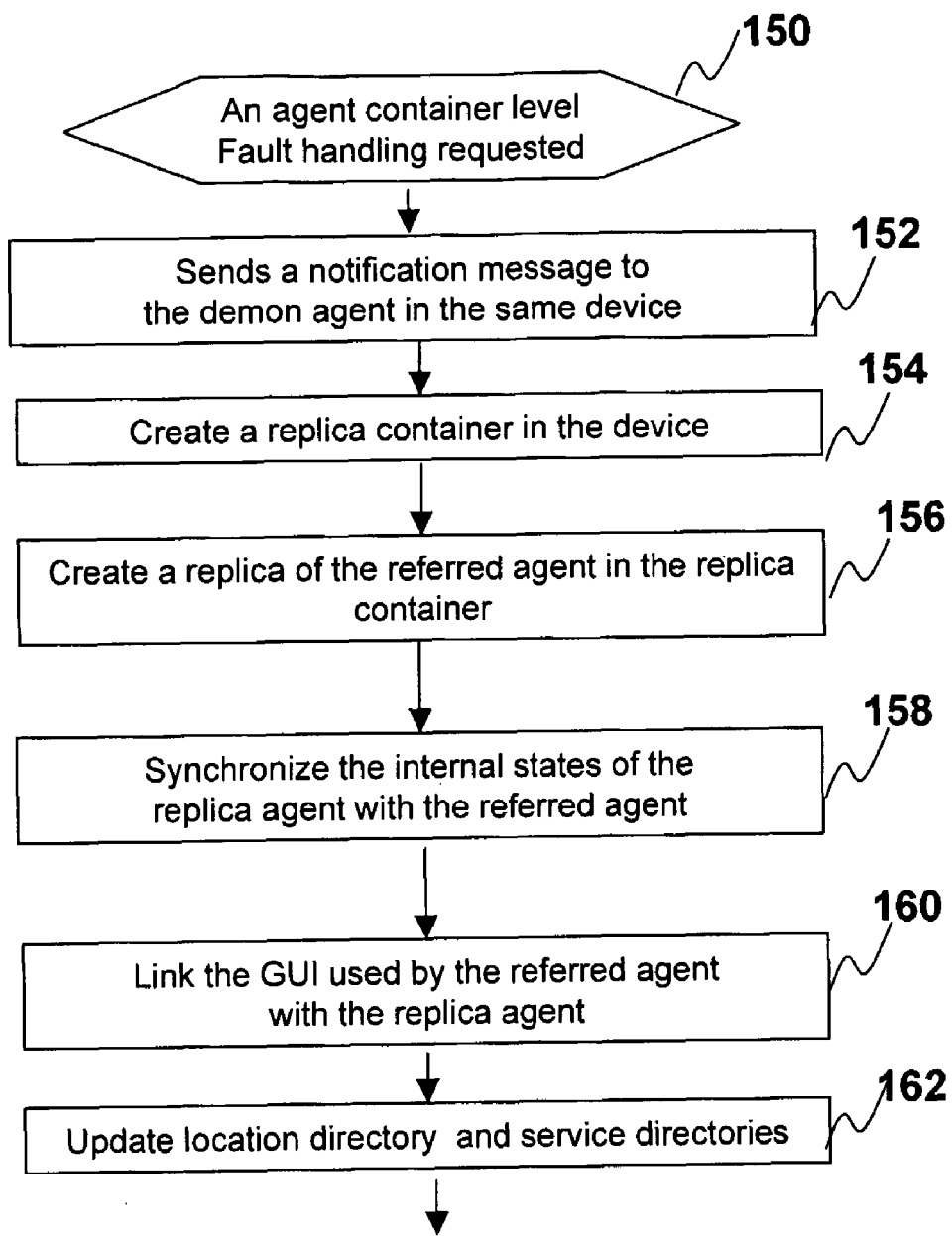
FIG. 11 shows steps in a method of anomaly management in another embodiment of the invention for the MAS shown in FIG. 10.

FIG. 11 shows steps in a method of handling an agent container level anomaly according to one embodiment of the invention in which an anomaly is detected with arises from a condition associated with an agent container such as an agent container level fault.

If an anomaly has arisen in an interaction at this level, the anomaly management agent 3b will generate an internal request (step 150) to manage the fault. Once it has identified that the anomaly may be caused by a condition associated with the agent container of the referred agent, the anomaly management agent 3b sends a message to the demon agent of the device 58 (step 152). The demon agent 70, then executes an anomaly management predefined recovery process to remedy the condition of the agent container causing the anomaly to occur in the interaction between the referred and referring agents.

In the process, the demon agent creates a replica agent container 146 in the device 58 (step 154). Within the new agent container 146, the demon agent 70 creates a replica agent 142 (step 156). Then, the demon agent 70 transfers the internal state of the referred agent 7 to the new replica agent 142 (step 158). After that, the demon agent 70 removes the link between the GUI 60 and the referred agent 7, and creates new link between the GUI 60 and the new replica agent 142 (step 160). Finally, if this process is executed successfully, the demon agent 70 sends back a message to the anomaly management agent 3b. On receiving the message, the anomaly management agent 3b updates the location directory 12 (for example white page 12) and the service directory 13 (for example, yellow page 13) (step 162).

Once an anomaly handling process has been completed, (i.e., for each type of service, agent, and agent container level anomalies (for example, faults)), the anomaly management agent 3b creates a feedback report to the original referring agent 6. The original referring agent 6 can be configured to re-initiate or re-interact with the restored/replica agent 142 following receipt of the feedback report according to some embodiments of the invention. Alternatively, the anomaly management agent 3b may not send a feedback report (shown schematically by arrow 25 in FIG. 1) unless the repair process exceeds a predetermined time interval, in which case the referring agent 142 may be configured to automatically reattempt to interact with the agent (which is now replaced or restored) after a predetermined time interval, unless it receives a notification from the anomaly management agent.

Those skilled in the art will appreciate that suitable devices for a distributed computing environment which a user may operate can include wireless devices, where the term wireless device refers to any device capable of wireless operation, for example mobile or portable devices capable of voice and/or data communications and having internal processing capabilities (include data processing capabilities such as that provided by laptop computers/personal digital assistants etc.), as well as devices whose access to a communications network is provided by other means.

The MAS according to the invention supports fault management for real-time interactions has the ability to manage interaction anomalies (including faults) dynamically in some embodiments of the invention. In one embodiment of the invention, users of the MAS comprise a mobile workforce, for example, a mobile employee workforce. In such an embodiment, examples of the applications supported by the MAS can comprises comprise job allocation applications etc, which several users may seek to interact with at any one time. Such applications can also require up-dating in real-time. In such an embodiment dynamic anomaly management, particularly if the anomaly management can be performed without perceptibly affective the service provided to the user, is particularly desirable. Other real-time applications which benefit from dynamic anomaly management include E-commerce applications, on-line gambling and auctions etc., etc.

The anomaly management solution provided by the invention is scalable and is suitable for MASs having a very large number of agents (several thousands and more), and thus is particularly useful for large mobile workforces or large student bodies etc. Typically, such users are remotely located from each other and may wish to engage in real-time interactions with each other or with shared applications supported by the MAS when the devices the users operate are connected to the internet. The connection means via which the users are able to interact may be of the "always on" type (for example, a broadband telephone or cable connection) or a dial-up connection comprising any suitable fixed line and/or wireless connection means or any other suitable connection type.

For clarity, only a limited number of agents are shown in the embodiment shown schematically in FIG. 1. Those skilled in the art will readily understand that the concepts described can be extended to MAS architectures in which several thousand agents are deployed, in which several hundred administration agents may be deployed, and in which each agent group is assigned a sufficient plurality of anomaly management agents according to the number of agents assigned to each agent group.

It will be appreciated by those skilled in the art, that the anomaly management scheme for a MAS described herein does not need to be implemented only for "faults", but other factors which affect an interaction between a plurality of agents which deviate from the expectations of one of the agents, can also be used to trigger an anomaly report being sent to an anomaly management agent. For example, if two agents are operating different versions of the same software, they may be able to interact sufficiently for the given interaction not to register as a fault, but the anomaly which one or both agents may detect in the interaction may enable the agent operating in accordance with the higher version to report the other agent as requiring an upgrade to the same version.

The text of the abstract repeated below is hereby incorporated into the description:

An anomaly management method is provided for a MAS in which a plurality of application agents are arranged to be capable of interacting with each other over a communications network. The MAS has a plurality of anomaly management agents arranged to receive reports from a referring agent regarding a referred agent when a referring agent has determined an interaction anomaly has occurred which was potentially caused by one or more conditions associated with a referred agent. The anomaly management agent is arranged to determine one or more conditions associated with the referred agent which have caused the interaction anomaly. The anomaly management agent is also arranged to remedy the condition. The method comprises at least one of said plurality of anomaly management agents receiving a message containing information related to the interaction with the referred agent from the referring agent. The message comprises information identifying the referred agent and other information related to the interaction anomaly. One or more possible conditions associated with the referred agent which may have caused the interaction anomaly are determined from the information provided by the referring agent. A plurality of tests are then performed to determine at least one condition associated with the referred agent. Finally, the condition associated with the referred agent is remedied. The referring agent may then be provided with feedback information to enable the interaction to be resumed or to continue.

What is claimed is:

1. An inter-agent interaction anomaly management method for a distributed computing environment implemented as a communications network comprising a plurality of devices, wherein said plurality of devices collectively comprise a multi-agent system supporting inter-agent interactions in said distributed computing environment, the system comprising a plurality of application agent groups, each application agent group of said plurality of application agent groups comprising one or more application agents, and one or more administrative agents arranged to flexibly assign one or more anomaly management agents to each application agent group of said plurality of application agent groups of said multi-agent system, the inter-agent interaction anomaly management method comprising:
   a referring application agent of one of the plurality of devices, said at least one of the plurality of devices including a processor, performing the steps of:
      participating or seeking to participate in an interaction with a referred application agent of another one of said plurality of devices;
      determining that an interaction anomaly has occurred if the interaction with said referred application agent did not proceed in accordance with the expectations of the referring application agent;
      determining if a condition related to the referred application agent has caused said interaction anomaly in the interaction by performing the steps of:
         communicating with one or more agent description directories which associate the referred application agent with one or more said anomaly management agents to determine which one or more of said anomaly management agents should receive a report message;
         generating the report message which contains information related to the interaction anomaly and enabling the referred application agent to be identified by an anomaly management agent; and
      referring the referred application agent by sending the report message to at least one receiving anomaly management agent associated with the application agent group of the referred application agent, whereby the information provided by the report message is processed by a receiving anomaly management agent to determine if at least one condition affecting the referred application agent has caused the interaction anomaly;
   at least one of the administration agents performing the steps of:
      contacting a directory facilitator agent to get a list of all the agent descriptions registered by application agents and anomaly management agents;
      calculating a load index value which indicates how many anomaly management agents are providing an anomaly management service for how many application agents in each application agent group of said plurality of application agent groups;
      comparing the load index value of each application agent group of said plurality of application agent groups with a predetermined value in a load balancing rule which balances the load of application agents to anomaly management agents for each application agent group of said plurality of application agent groups in the multi-agent system; and
      in the event that there are any application agent groups that have an unbalanced load index,
      re-assigning one or more anomaly management agents from application agent groups which have surplus anomaly management agents to one or more overloaded application agent group that have too few anomaly management agents; and
      modifying a service description of each re-assigned anomaly management agent and updating a registry of the directory facilitator agent.

2. The method as claimed in claim 1, wherein said administration agent balances the load of application agents in each application agent group of said plurality of application agent groups served by anomaly management agents using a load balancing rule which comprises:
   a tag for the number of anomaly management agents for the size of the application agent group, the tag consisting of:
   a tag representing a minimum number of anomaly management agents for the application agent group;
   a tag representing a maximum number of anomaly management agents for the application agent group;
   a tag representing a minimum number of agents in the application agent group; and
   a tag representing a maximum number of agents in the application agent group; and
   a tag used to specify re-assignment criteria to determine the anomaly management agents that should be re-assigned to other load unbalanced application agent groups.

3. The method as claimed in claim 2, wherein said re-assignment criteria is specified as:
the anomaly management agents that have been idle for the longest time duration among the anomaly management agents which are serving an application agent group with too many anomaly management agents for the group size should be moved to an overloaded application agent group that has too small a number of anomaly management agents for the application agent group size.

4. An inter-agent interaction anomaly management method for distributed computing environment implemented as a communications network comprising a plurality of devices, wherein said plurality of devices comprise a multi-agent system supporting inter-agent interactions in said distributed computing environment, the multi-agent system comprising a plurality of application agent groups, each application agent group of said plurality of application agent groups comprising one or more application agents, and one or more administrative agents arranged to flexibly assign one or more anomaly management agents to each application agent group of said plurality of application agent groups of said multi-agent system, the inter-agent interaction anomaly management method comprising:
a referring application agent of one of the plurality of devices, said at least one of the plurality of devices including a processor, performing the steps of:
participating or seeking to participate in an interaction with a referred application agent of another one of said plurality of devices;
determining that an interaction anomaly has occurred if the interaction with said referred application agent did not proceed in accordance with expectations of the referring application agent;
determining if a condition related to the referred application agent has caused said interaction anomaly in the interaction by performing the steps of:
communicating with one or more agent description directories which associate the referred application agent with one or more said anomaly management agents to determine which one or more of said anomaly management agents should receive a report message;
generating the report message which contains information related to the interaction anomaly and enabling the referred application agent to be identified by an anomaly management agent; and
referring the referred application agent by sending the report message to at least one receiving anomaly management agent associated with the application agent group of the referred application agent, whereby the information provided by the report message is processed by a receiving anomaly management agent to determine if at least one condition affecting the referred application agent has caused the interaction anomaly;
wherein the inter-agent interaction anomaly management method is arranged to provide a load balancing scheme for said multi-agent system and the inter-agent interaction anomaly management method maintains a number of anomaly management agents associated with a number of application agents within a predetermined range, the inter-agent interaction anomaly management method comprising the steps of:
determining the number of application agents in each application agent group of said plurality of application agent groups of the multi-agent system;
determining the number of anomaly management agents responsible for each application agent group of said plurality of application agent groups of the multi-agent system;
determining, for each application agent group of said plurality of application agent groups of the multi-agent system, a ratio of the number of anomaly management agents providing an anomaly management service for each application agent in the application agent group to the number of application agents in the application agent group, and,
modifying a location directory entry for one or more said anomaly management agents associated with said application agent groups for which the ratio is above the predetermined range to re-associate the anomaly management agents with application agent groups for which the ratio is below said predetermined range.

5. An inter-agent interaction anomaly management method for a distributed computing environment implemented as a communications network comprising a plurality of devices, wherein said plurality of devices comprise a multi-agent system supporting inter-agent interactions in said distributed computing environment, the multi-agent system having a configuration to run a plurality of application agent groups, each application agent group of said plurality of application agent groups comprising one or more application agents, and having a configuration to run one or more administrative agents, the inter-agent interaction anomaly management method comprises:
a referring application agent of one of the plurality of devices, said at least one of the plurality of devices including a processor, performing steps of:
participating or seeking to participate in an interaction with a referred application agent of another one of said plurality of devices;
determining that an interaction anomaly has occurred if the interaction with said referred application agent did not proceed in accordance with the expectations of the referring application agent;
determining if a condition related to the referred application agent has caused said interaction anomaly in the interaction by:
communicating with one or more agent description directories which associate the referred application agent with one or more anomaly management agents to determine which one or more of said anomaly management agents should receive a report message;
generating the report message which contains information related to the interaction anomaly and enabling the referred application agent to be identified by an anomaly management agent; and
referring the referred application agent by sending the report message to at least one receiving anomaly management agent associated with an application agent group of the referred application agent, whereby the information provided by the report message is processed by a receiving anomaly management agent to determine if at least one condition affecting the referred application agent has caused the interaction anomaly;
each of said one or more administrative agents performing steps of:
assigning one or more said anomaly management agents to each application agent group of said plurality of application agent groups of said multi-agent system, and reassigning surplus anomaly management agents to an overloaded application agent group if the overloaded application agent group has a number of anomaly management agents serving a number of application agents which is out of balance compared with a desired value of a load index, wherein the load index indicates the number of anomaly management agents and the number of application agents in each application agent group of said plurality of application agent groups.

6. A method as claimed in claim 5, wherein a service description for each anomaly management agent in the multi-agent system is advertised by the respective anomaly management agent sending an appropriate communication to a directory facilitator agent which maintains a service directory that contains mappings between the agent names of anomaly management agents and services offered by said anomaly management agents.

7. A method as claimed in claim 6, wherein the referring application agent performs said step of communicating with one or more agent description directories by creating a query message that is sent to the directory facilitator agent, the query message containing a service description and an identifier for the application agent group assigned to the referring application agent, wherein the method further comprises the steps of:
the directory facilitator agent receiving said query message searching a service directory to locate any agent descriptions that match the service description contained in the query message;
the directory facilitator agent which receives said query message sending a response message to the referring application agent containing an agent description for an anomaly management agent having a service description matching the service description contained in the query message, the agent description containing a identifier for the anomaly management agent and the address of the device the anomaly management agent is located on.

8. A method as claimed in claim 7, wherein an anomaly management agent description contains a service description which contains a group number for an application agent group for which the anomaly management agent is responsible.

9. A method as claimed in claim 8, wherein the anomaly management agent is flexibly assigned to application agent groups by being able to change the application agent group for which the anomaly management agent is responsible by changing a service description for the anomaly management agent to a different group number when the number of application agents in a current application agent group is relatively smaller than the number of application agents in another application agent group.

10. A method as claimed in claim 5, further comprising one of said one or more administration agents performing the steps of:
contacting said directory facilitator agent to get a list of all agent descriptions registered by application agents and anomaly management agents;
calculating a load index value which indicates how many anomaly management agents are providing an anomaly management service for how many application agents in each application agent group of said plurality of application agent groups;
comparing the load index value of each application agent group of said plurality of application agent groups with a predetermined value in a load balancing rule which balances the load of application agents to anomaly management agents for each application agent group of said plurality of application agent groups in the multi-agent system; and
in the event that there are any application agent groups that have an unbalanced load index,
re-assigning the anomaly management agents from application agent groups which have surplus anomaly management agents to one or more overloaded application agent group that have too few anomaly management agents; and
modifying the service descriptions of the re-assigned anomaly management agents and updating a registry of the directory facilitator agent.

11. A method as claimed in claim 10, wherein the one or more administration agents balance the load of application agents in each application agent group of said plurality of application agent groups served by anomaly management agents using a load balancing rule which comprises:
a tag for the number of anomaly management agents for the size of the application agent group, the tag consisting of:
a tag representing a minimum number of anomaly management agents for the application agent group;
a tag representing a maximum number of anomaly management agents for the application agent group;
a tag representing a minimum number of agents in the application agent group; and
a tag representing a maximum number of agents in the application agent group; and
a tag used to specify re-assignment criteria to determine the anomaly management agents that should be re-assigned to one or more other load unbalanced application agent groups.

12. A method as claimed in claim 11, wherein said re-assignment criteria is specified as:
anomaly management agents that have been idle for the longest time duration among the anomaly management agents which are serving an application agent group with too many anomaly management agents for the application agent group size should be moved to an overloaded application agent group that has too small a number of anomaly management agents for the application agent group size.

13. A method as claimed in claim 5, in which the referring application agent sought to initiate participation in the interaction with the referred application agent, prior to said step of determining that the interaction with said referred application agent is not proceeding in accordance with the expectations of the referring application agent.

14. A method as claimed in claim 5, in which the referring application agent sought to respond to the referred application agent to participate in an interaction with the referred application agent, prior to said step of determining that the interaction with said referred application agent is not proceeding in accordance with the expectations of the referring application agent.

15. A method as claimed in claim 5, wherein at least one condition causing the interaction anomaly comprises a fault related to a service component of the referred application agent.

16. A method as claimed in claim 15, wherein at least one condition causing an interaction anomaly comprises a fault related to the device supporting the referred application agent.

17. A method as claimed in claim 15, wherein at least one condition causing the interaction anomaly comprises a fault related to an agent container associated with the referred application agent.

18. A method as claimed in claim 15, wherein at least one condition causing the interaction anomaly comprises a fault related to the referred application agent.

19. A method as claimed in claim 5, wherein the referred application agent reports to one of a plurality of anomaly management agents arranged to manage referrals related to the referred application agent, said one of the plurality of anomaly management agents having been associated with the referred application agent in accordance with a load balancing rule implemented within the multi-agent system using one or more agent description directories provided for the multi-agent system.

20. A method as claimed in claim 5, wherein the anomaly management agent processing the reported information proceeds to implement an anomaly management scheme to remedy the at least one condition affecting the referred application agent by determining the cause of the interaction anomaly detected in the interaction between the referring application agent and the referred application agent by determining at least one condition associated with the referred application agent which has caused the interaction by performing the steps of:
   processing information provided by the referring application agent to identify a device associated with the referred application agent;
   sending a test message to the device associated with the referred application agent to determine if at least one condition is associated with the device is a condition which caused the interaction anomaly in the interaction between the referring and referred application agents; and
   in the event no response to the test message is received by the anomaly management agent from the device, or if a test message is received containing information which, when processed indicates that the device has a condition which caused the interaction anomaly,
   determining a condition affecting the device exists which has caused the anomaly in the interaction between the referred and referring application agents.

21. A method as claimed in claim 20, wherein the condition determined is a fault associated with the device.

22. A method as claimed in claim 20, wherein in the step of processing information provided by the referring application agent to identify the device associated with the referred application agent, an agent container associated with the device associated with the referred application agent is also identified, wherein the method further comprises the steps of:
   the anomaly management agent sending a test message to the agent container of the referred application agent; and,
   in the event no response to the test message is received from the agent container or if a test message is received containing information which, when processed indicates that the agent container has a condition which caused the interaction anomaly,
   determining a condition affecting the agent container exists which has caused the interaction anomaly in the interaction between the referred and referring application agents.

23. A method as claimed in claim 22, wherein said condition of the agent container is a fault associated with the agent container.

24. A method as claimed in claim 20, the method further comprising:
   sending a test message to the referred application agent to determine if the referred application agent has a condition which caused the interaction anomaly; and
   if the response from the referred application agent does not meet one or more predetermined criteria,
   determining the referred application agent has said condition which has caused the interaction anomaly.

25. A method as claimed in claim 24, wherein the anomaly management agent determines that a detected condition is related to a fault associated with the referred application agent.

26. A method as claimed in claim 25, wherein the condition is not related to a fault associated with the referred application agent, and the anomaly management agent determines that the detected condition requires the referred application agent to be modified to interact with the referring application agent.

27. A method as claimed in claim 20, wherein in the event that no condition is determined by the anomaly management agent to be associated with the referred application agent, the anomaly management agent performs a service level test.

28. A method as claimed in claim 20, wherein following said steps performed to determine one or more conditions which have caused the interaction anomaly, the anomaly management agent further performs the steps of:
   generating appropriate feedback information related to the condition; and
   sending the feedback information to the referring application agent.

29. A method as claimed in claim 5, wherein
   a plurality of application agents are arranged to be capable of interacting with each other over a communications network,
   wherein one or more of said anomaly management agents receive said report message and is arranged to determine one or more conditions associated with the referred application agent which have caused the interaction anomaly,
   wherein each anomaly management agent receiving said report message is further arranged to remedy said one or more conditions to remove said one or more conditions,
   wherein the report message contains information related to the interaction with the referred application agent from the referring application agent comprising information identifying the referred application agent and other information related to the interaction anomaly, and said method further comprises each said anomaly management agent:
   receiving said report message identifying one or more possible conditions associated with the referred application agent from the information provided by the referring application agent which may have caused the interaction anomaly;
   performing a plurality of tests to determine at least one condition associated with the referred application agent and selected from said possible one or more conditions of the referred application agent which caused the anomaly to occur; and
   remedying the condition associated with the referred application agent.

30. A method as claimed in claim 29, wherein said at least one condition associated with the referred application agent is a condition associated with one of the following:
   a device associated with the referred application agent;
   an agent container associated with the referred application agent;

the referred application agent;

a service provided by the referred application agent.

31. A method as claimed in claim 29, wherein said at least one condition comprises a fault.

32. A method as claimed in claim 29, wherein the referring application agent selects an anomaly management agent to refer the referred application agent to by reference to a location directory and a service directory containing a description of one or more characteristics of the referred application agent which associates the referred application agent with a anomaly management agent.

33. A method as claimed in claim 29, wherein the referring application agent provides information to the anomaly management agent which includes information identifying the referred application agent, a time of the referral, one or more detected conditions associated with the referred application agent which the referring application agent has determined are relevant to the anomaly; and an identity of the referring application agent.

34. A method as claimed in claim 29, wherein the referred application agent comprises one or more role components, wherein the anomaly management agent is capable of communicating with a mediating agent to provide a description of each of said one or more role components, and wherein the condition which causes the anomaly in the interaction between the referred application agent and the referring application agent is determined to be associated with the service provided by the referred application agent, and to remedy the condition, the anomaly management agent obtains a new description of a service role component for the referred application agent from the mediating agent.

35. A method as claimed in claim 29, wherein, when a condition is determined to exist with a referred application agent which has cause the anomaly, one of said one or more anomaly management agents moves to an agent container of the referred application agent with the condition and the following are performed:

creating a replica agent of the referred application agent;

copying an internal state of the referred application agent to the replica agent;

updating a registry by replacing the referred application agent registry entry with a registry entry for the replica agent, to enable the replica agent to interact with the referring application agent.

36. A method as claimed in claim 29, wherein the referred application agent is provided with at least one service role component and wherein said at least one service role component is determined to be a cause of a condition causing the interaction anomaly, the method further comprising:

one of said one or more anomaly management agents sending a request message to the referred application agent identifying said at least one service role component causing the interaction anomaly;

the referred application agent processing the received message;

the referred application agent sending a message to a mediator agent in the multi-agent system;

the mediator agent providing a replacement service role component for each service role component causing the interaction anomaly to the referred application agent;

the referred application agent replacing each service role component causing the interaction anomaly with a service role component provided by the mediator agent.

37. A method as claimed in claim 29, wherein, when said at least one condition associated with the referred application agent is a condition associated with an agent container provided by the referred application agent, further comprising the steps of:

one of said one or more anomaly management agents sending a notification message to a demon agent of a device associated with the referred application agent;

on receiving the message, the demon agent creating a replica container of the agent container of the referred application agent;

the demon agent creating one or more replica agents for each of the agents in the agent container;

the demon agent copying internal states of the one of more agents in the agent container into one or more replica agents in the replica container; and the demon agent updating a location directory and a service directory with agent descriptions of each of the replica agents.

38. An inter-agent interaction anomaly management system for a distributed computing environment implemented as a communications network comprising a plurality of devices, wherein said plurality of devices comprise a multi-agent system supporting inter-agent interactions in said distributed computing environment, the multi-agent system having configuration to run a plurality of application agent groups, each application agent group of the plurality of application agent groups comprising one or more application agents, and having a configuration to run one or more administrative agents, the inter-agent interaction anomaly management system comprising:

at least one said plurality of devices comprising a processing system having at least one processor and having a configuration to run a referring application agent to:

participate or seek to participate in an interaction with a referred application agent of another one of said plurality of devices;

determine that an interaction anomaly has occurred if the interaction with said referred application agent did not proceed in accordance with the expectations of the referring application agent;

determine if a condition related to the referred application agent has caused said interaction anomaly in the interaction by:

communicating with one or more agent description directories which associate the referred application agent with one or more said anomaly management agents to determine which one or more of said anomaly management agents should receive a report message;

generating the report message which contains information related to the interaction anomaly and enabling the referred application agent to be identified by an anomaly management agent; and referring the referred application agent by sending the report message to at least one receiving anomaly management agent associated with the application agent group of the referred application agent, whereby the information provided by the report message is processed by a receiving anomaly management agent to determine if at least one condition affecting the referred application agent has caused the interaction anomaly, each of said one or more administrative agents being configured to assign one or more anomaly management agents to each application agent group of said plurality of application agent groups of said multi-agent system and being configured to reassign surplus anomaly management agents to an overloaded application agent group if the overloaded application agent group has a number of anomaly management agents serving a number of application agents which is out of balance compared with a desired value of a load index, wherein the load index indicates the number of anomaly management agents and the number of application agents in each application agent group of said plurality of application agent groups.

39. A system as claimed in claim 38, comprising a plurality of anomaly management agents, wherein each anomaly management agent is associated with one or more agent containers, each agent container being associated with at least one application agent, and the system further comprises:
an agent location registry; and
an agent service registry,
wherein the agent location registry and agent service registry collectively provide a description of the location and service of agents in the multi-agent system, and
wherein each of said anomaly management agents is associated with one or more agents of the multi-agent system, wherein collectively the agent location registry and the agent service registry are arranged to enable a referring application agent to identify an anomaly management agent for reporting to when said referred application agent is suspected of having a condition which causes an interaction anomaly in an interaction between the referred application agent and the referring application agent.

40. A system as claimed in claim 38, wherein a demon agent resides on a client device associated with an application agent of the multi-agent system, wherein each said demon agent is arranged to monitor the functionality of the application agent of the client device the said demon agent resides on.

41. A system as claimed in claim 38, wherein one or more executable software component mediator agents maintain a library of executable software components for an application agent of the multi-agent system to enable the application agent to respond to query messages from application agents.

42. A system as claimed in claim 38, wherein an anomaly management agent contacts an agent management system agent and a directory facility agent in the multi-agent system to update one or more registries of the multi-agent system with information related to the referred application agent following the anomaly management agent remedying a condition associated with the referred application agent which caused the interaction anomaly.

43. A system as claimed in claim 42, wherein the information provided to update at least one of said one or more registries of the multi-agent system comprises information related to a replica agent replacing the referred application agent.

44. A system as claimed in claim 38, wherein an application agent, an agent container, and a demon agent residing on a client device in the multi-agent system each implement a test interface that responds to a test message from an anomaly management agent of the multi-agent system.

45. A system as claimed in claim 38, arranged to maintain the number of anomaly management agents associated with a number of agents within a predetermined range, the system further having a configuration to:
determine the number of application agents in each application agent group of said plurality of application agent groups of the multi-agent system;
determine the number of anomaly management agents responsible for each application agent group of said plurality of application agent groups of the multi-agent system;
determine, for each application agent group of said plurality of application agent groups of the multi-agent system, the ratio of the number of anomaly management agents providing an anomaly management service for each application agent in the application agent group to the number of application agents in the application agent group, and,
modify a location directory and/or service directory entry for one or more said anomaly management agents associated with said application agent groups for which the ratio is above the predetermined range to re-associate the anomaly management agents with one or more application agent groups for which the ratio is below said predetermined range.

46. A processing system having a configuration to run an administrative agent, which is part of a multi-agent system supporting inter-agent interactions in a distributed computing environment, the multi-agent system having configuration to run a plurality of application agent groups, each application agent group of said plurality of application agent groups comprising one or more application agents, wherein a referring application has a configuration to:
participate or seek to participate in an interaction with a referred application agent;
determine that an interaction anomaly has occurred if the interaction with said referred application agent did not proceed in accordance with the expectations of the referring application agent;
determine if a condition related to the referred application agent has caused said interaction anomaly in the interaction by:
communicating with one or more agent description directories which associate the referred application agent with one or more said anomaly management agents to determine which one or more of said anomaly management agents should receive a report message;
generating the report message which contains information related to the interaction anomaly and enabling the referred application agent to be identified by an anomaly management agent; and
referring the referred application agent by sending the report message to at least one receiving anomaly management agent associated with the application agent group of the referred application agent, whereby the information provided by the report message is processed by a receiving anomaly management agent to determine if at least one condition affecting the referred application agent has caused the interaction anomaly,
wherein the processing system having the configuration to run the administrative agent is configured to include at least one processor and to assign one or more anomaly management agents to each application agent group of said plurality of application agent groups of said multi-agent system and being configured to reassign surplus anomaly management agents to an overloaded application agent group if the overloaded application agent group has a number of anomaly management agents serving a number of application agents which is out of balance compared with a desired value of a load index, wherein the load index indicates the number of anomaly management agents and the number of application agents in each application agent group of said plurality of application agent groups.

47. An inter-agent interaction anomaly management method for a distributed computing environment implemented as a communications network comprising a plurality of communications devices collectively comprising a multi-agent system supporting inter-agent interactions in said distributed computing environment, the system comprising a plurality of application agent groups, each application agent group of said plurality of application agent groups comprising one or more application agents, and one or more administrative agents arranged to flexibly assign one or more anomaly management agents to each application agent group of said plurality of application agent groups of said multi-agent system, the inter-agent interaction anomaly management method comprising:

a referring application agent including a configuration having a processor and performing the steps of:
participating or seeking to participate in an interaction with a referred application agent;
determining that an interaction anomaly has occurred if the interaction with said referred application agent did not proceed in accordance with expectations of the referring application agent;
determining if a condition related to the referred application agent has caused said interaction anomaly in the interaction by performing the steps of:
communicating with one or more agent description directories which associate the referred application agent with one or more said anomaly management agents to determine which one or more of said anomaly management agents should receive a report message;
generating the report message which contains information related to the interaction anomaly and enabling the referred application agent to be identified by an anomaly management agent; and
referring the referred application agent by sending the report message to at least one receiving anomaly management agent associated with the application agent group of the referred application agent, whereby the information provided by the report message is processed by a receiving anomaly management agent to determine if at least one condition affecting the referred application agent has caused the interaction anomaly;

wherein the inter-agent interaction anomaly management method is arranged to provide a load balancing scheme for said multi-agent system and the inter-agent interaction anomaly management method maintains a number of anomaly management agents associated with a number of application agents within a predetermined range, the inter-agent interaction anomaly management method comprising the steps of:
determining the number of application agents in each application agent group of said plurality of application agent groups of the multi-agent system;
determining the number of anomaly management agents responsible for each application agent group of said plurality of application agent groups of the multi-agent system;

determining, for each application agent group of said plurality of application agent groups of the multi-agent system, a ratio of the number of anomaly management agents providing an anomaly management service for each application agent in the application agent group to the number of application agents in the application agent group, and modifying a service directory entry for one or more said anomaly management agents associated with said application agent groups for which the ratio is above the predetermined range to re-associate the anomaly management agents with application agent groups for which the ratio is below said predetermined range.

* * * * *